US012249272B2

(12) United States Patent
Jeon et al.

(10) Patent No.: US 12,249,272 B2
(45) Date of Patent: Mar. 11, 2025

(54) DISPLAY DEVICE AND A TILED DISPLAY DEVICE INCLUDING THE SAME

(71) Applicant: Samsung Display Co., Ltd., Yongin-si (KR)

(72) Inventors: Sang Jin Jeon, Yongin-si (KR); Min Chul Shin, Yongin-si (KR); Jung Hwan Hwang, Yongin-si (KR); Sung Hwan Kim, Yongin-si (KR); Ji Youn Seo, Yongin-si (KR); Kye Uk Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/486,985

(22) Filed: Oct. 13, 2023

(65) Prior Publication Data

US 2024/0194127 A1 Jun. 13, 2024

(30) Foreign Application Priority Data

Dec. 12, 2022 (KR) ........................ 10-2022-0173042

(51) Int. Cl.
*G09G 3/32* (2016.01)

(52) U.S. Cl.
CPC ......... *G09G 3/32* (2013.01); *G09G 2300/026* (2013.01); *G09G 2310/0275* (2013.01); *G09G 2310/0297* (2013.01); *G09G 2310/08* (2013.01); *G09G 2320/0209* (2013.01)

(58) Field of Classification Search
CPC ............... G09G 3/32; G09G 2300/026; G09G 2310/0275; G09G 2310/0297; G09G 2310/08; G09G 2320/0209
See application file for complete search history.

(56) References Cited

U.S. PATENT DOCUMENTS

2010/0309185 A1* 12/2010 Koester .................... G09G 3/32 345/82
2016/0078814 A1* 3/2016 Ryu ..................... G09G 3/3233 345/83

FOREIGN PATENT DOCUMENTS

CN 108281114 A 7/2018

* cited by examiner

*Primary Examiner* — Lisa S Landis
(74) *Attorney, Agent, or Firm* — Womble Bond Dickinson (US) LLP

(57) ABSTRACT

Provided are a display device and a tiled display comprising the same. The display device includes PWM data lines for respectively receiving PWM data voltages, first to third data lines for respectively receiving first to third data voltages, sub-pixels respectively connected to the PWM data lines, respectively connected to the first to third data lines, and respectively including at least one light-emitting element, a global power supply line for receiving a global power supply voltage, and a first demultiplexer between the PWM data lines and the global power supply line, wherein the PWM data voltages have grayscale voltages from a black grayscale voltage to a white grayscale voltage, the black grayscale voltage being greater than or equal to the global power supply voltage.

20 Claims, 18 Drawing Sheets

DISPLAY DEVICE AND A TILED DISPLAY DEVICE INCLUDING THE SAME

CROSS-REFERENCE TO RELATED APPLICATION

This application claims priority to, and the benefit of, Korean Patent Application No. 10-2022-0173042 filed on Dec. 12, 2022, in the Korean Intellectual Property Office (KIPO), the entire contents of both of which are incorporated by reference herein.

BACKGROUND

1. Field

The present disclosure relates to a display device and a tiled display including the same.

2. Description of the Related Art

With the advance of information-oriented society, more and more demands are placed on display devices for displaying images in various ways. The display device may be a flat panel display device, such as a liquid crystal display, a field emission display and a light-emitting display.

A light-emitting display device may include an organic light-emitting display device including an organic light-emitting diode element as a light-emitting element, or a light-emitting diode display device including an inorganic light-emitting diode element, such as a light-emitting diode (LED) as a light-emitting element.

Meanwhile, as the utilization range of display devices increases recently, demand for large-area display devices is increasing. However, manufacturing of the large-area display device using one display panel may be limited due to limitations in technology and manufacturing cost. Therefore, a method of implementing the large-area display device as a tiled display device combining a plurality of display devices without increasing the area of the display device has been proposed.

SUMMARY

Aspects of embodiments of the present disclosure provide a display device, and a tiled display including the same and capable of preventing or reducing occurrence of crosstalk due to coupling between a data line to which data voltage is not applied and a data line to which data voltage is applied when data voltages are distributed to data lines using a demultiplexer, and a tiled display device including the same.

However, embodiments of the present disclosure are not limited to those set forth herein. The above and other embodiments of the present disclosure will become more apparent to one of ordinary skill in the art to which the present disclosure pertains by referencing the detailed description of the present disclosure given below.

According to one or more embodiments of the present disclosure, there is provided a display device including PWM data lines for respectively receiving PWM data voltages, first to third data lines for respectively receiving first to third data voltages, sub-pixels respectively connected to the PWM data lines, respectively connected to the first to third data lines, and respectively including at least one light-emitting element, a global power supply line for receiving a global power supply voltage, and a first demultiplexer between the PWM data lines and the global power supply line, wherein the PWM data voltages have grayscale voltages from a black grayscale voltage to a white grayscale voltage, the black grayscale voltage being greater than or equal to the global power supply voltage.

The display device may further include a first power supply line for receiving a first power supply voltage, and connected to a first electrode of the at least one light-emitting element, wherein a voltage difference between the global power supply voltage and the black grayscale voltage is less than a voltage difference between the global power supply voltage and the first power supply voltage.

The display device may further include fan-out lines, and a second demultiplexer between the PWM data lines and the fan-out lines, and configured to selectively connect the fan-out lines to Q PWM data lines among the PWM data lines, or to Q first to third data lines among the first to third data lines, Q being an integer that is greater than or equal to 2.

The display device may further include a data-driving circuit for supplying the PWM data voltages to the fan-out lines, and a power supply for supplying the first to third data voltages and the global power supply voltage.

The sub-pixels may include a first sub-pixel, a second sub-pixel, and a third sub-pixel, wherein the second demultiplexer is configured to connect one of the fan-out lines to a first PWM data line that is connected to the first sub-pixel among the Q PWM data lines during a first period, to a second PWM data line that is connected to the second sub-pixel among the Q PWM data lines during a second period, and to a third PWM data line that is connected to the third sub-pixel among the Q PWM data lines during a third period.

The first demultiplexer may be configured to connect the second data line connected to the second sub-pixel, and the third data line connected to the third sub-pixel, to the global power supply line during the first period, connect the first data line connected to the first sub-pixel, and the third data line connected to the third sub-pixel, to the global power supply line during the second period, and connect the first data line connected to the first sub-pixel, and the second data line connected to the second sub-pixel, to the global power supply line during the third period.

The display device may further include a first data voltage line for receiving the first data voltage, a second data voltage line for receiving the second data voltage, and a third data voltage line for receiving the third data voltage, wherein the first demultiplexer is configured to connect the first data line to the first data voltage lines, the second data line to the second data voltage lines, and the third data line to the third data voltage line.

The light-emitting element may be a flip chip type micro light-emitting diode element.

According to one or more embodiments of the present disclosure, there is provided a display device including display devices, and a connection member between the display devices, wherein one display device among the display devices includes PWM data lines for respectively receiving PWM data voltages, first to third data lines for respectively receiving first to third data voltages, sub-pixels respectively connected to the PWM data lines, respectively connected to the first to third data lines, and including at least one light-emitting element, a first power supply line connected to a first electrode of the at least one light-emitting element, and for receiving a first power supply voltage, a global power supply line for receiving a global power supply voltage, and a first demultiplexer between the PWM data lines and the global power supply line, wherein the PWM data voltages include grayscale voltages ranging from a black grayscale voltage to a white grayscale voltage, and wherein a voltage difference between the global power supply voltage and the black grayscale voltage is less than a voltage difference between the global power supply voltage and the first power supply voltage.

A potential of the global power supply voltage may be less than or equal to the black grayscale voltage.

The one display device may further include fan-out lines, and a second demultiplexer between the PWM data lines and the fan-out lines, and configured to selectively connect one of the fan-out lines to Q PWM data lines among the PWM data lines, or to Q first to third data lines among the first to third data lines, Q being an integer greater than or equal to 2.

The one display device may further include a substrate, a first pad on a first surface of the substrate and connected to the global power supply line, and a first side wiring on the first surface, on a second surface opposite to the first surface, on a side surface between the first surface and the second surface, and connected to the first pad of the substrate.

The substrate may include glass.

The one display device may further include a first connection line on the second surface of the substrate, and connected to the first side wiring, a first flexible film connected to the first connection line through a first conductive adhesive member, and a power supply on the first flexible film, and configured to generate the global power supply voltage and the first to third data voltages.

The one display device may further include a second pad on the first surface of the substrate, and connected to one of the fan-out lines, and a second side wiring on the first surface, on the second surface, on the side surface, and connected to the second pad.

The first pad may be adjacent to a first side of the first surface of the substrate, wherein the second pad is adjacent to a second side opposite to the first side of the first surface of the substrate.

The one display device may further include a second connection line on the second surface, and connected to the second side wiring, a second flexible film connected to the second connection line through a second conductive adhesive member, and a data-driving circuit on the second flexible film, and configured to generate the PWM data voltages.

The display devices may be arranged in a matrix form in M rows and N columns, M and N being positive integers.

The light-emitting element may be a flip chip type micro light-emitting diode element.

The one display device may further include a first data voltage line for receiving a first data voltage, a second data voltage line for receiving a second data voltage, and a third data voltage line for receiving a third data voltage, wherein the first demultiplexer is configured to connect first data lines to the first data voltage lines, is configured to connect second data lines to the second data voltage lines, and is configured to connect third data lines to the third data voltage lines.

According to the aforementioned and other embodiments of the present disclosure, it is possible to reduce or minimize the effect of a voltage variation of one PWM data line on the voltage of a PWM data line adjacent thereto by an adjacent capacitance by reducing or minimizing the voltage difference between a black grayscale voltage and a global power supply voltage. Accordingly, it is possible to reduce or prevent the likelihood of the potential of the gate electrode of the first transistor of the sub-pixel being varied due to the potential of the PWM data line being varied by the adjacent capacitance. Therefore, it is possible to reduce or prevent crosstalk occurring in left and right peripheries of a black pattern, in which a gray color that is brighter than the upper and lower sides of the black pattern is recognized when displaying a black pattern in the center of a gray background.

BRIEF DESCRIPTION OF THE DRAWINGS

The above and other embodiments of the present disclosure will become more apparent by describing embodiments thereof with reference to the attached drawings, in which.

DETAILED DESCRIPTION

Figure 1A:
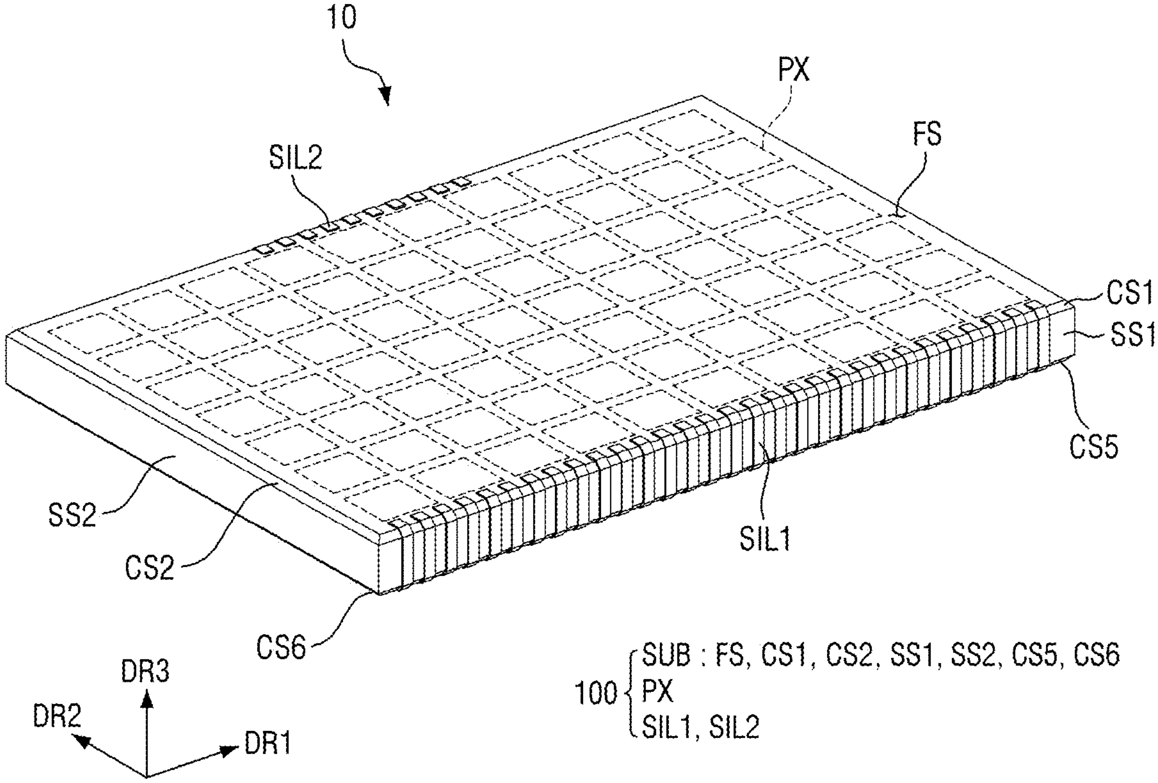
FIGS. 1A and 1B are perspective views illustrating a display device according to one or more embodiments.

Aspects of embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects of the present disclosure might not be described.

Unless otherwise noted, like reference numerals, characters, or combinations thereof denote like elements throughout the attached drawings and the written description, and thus, descriptions thereof will not be repeated. Further, parts not related to the description of one or more embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. Meanwhile, other expressions describing relationships between components, such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions, such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression, such as "at least one of A and B" may include A, B, or A and B. As used herein, the term "and/or" includes any and all combinations of one or more of the associated listed items. For example, the expression, such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
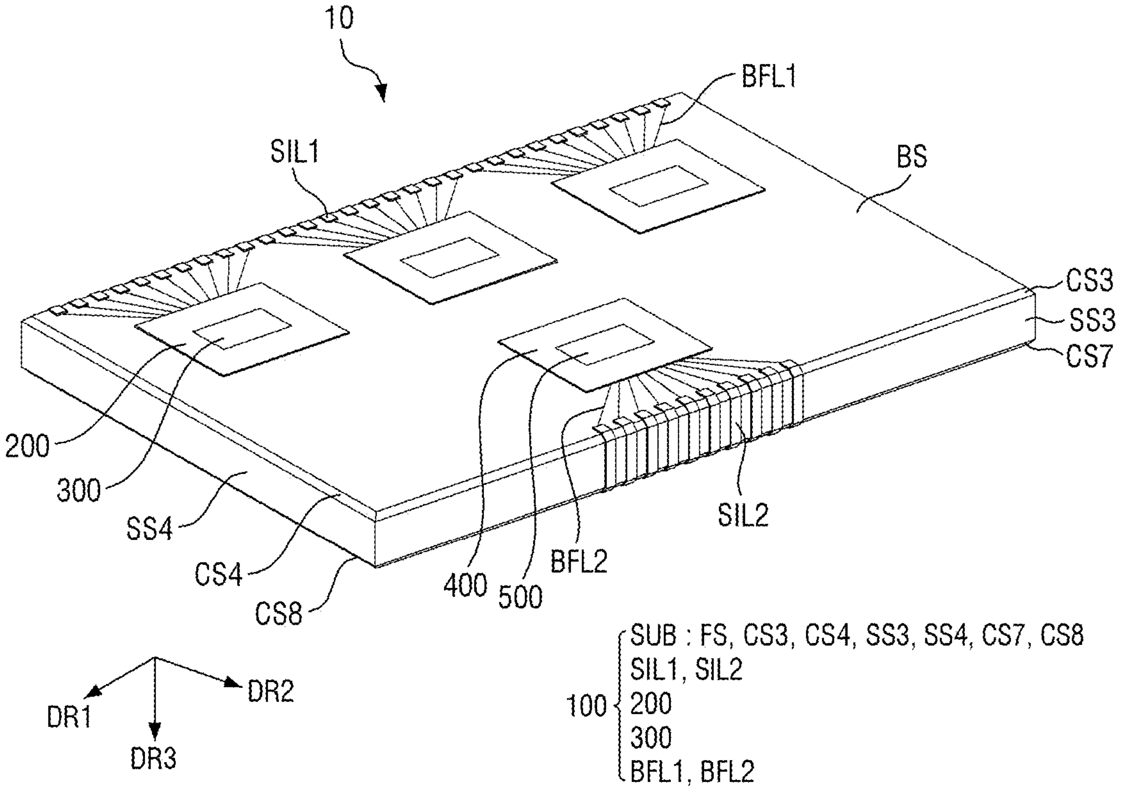
Figure 2:
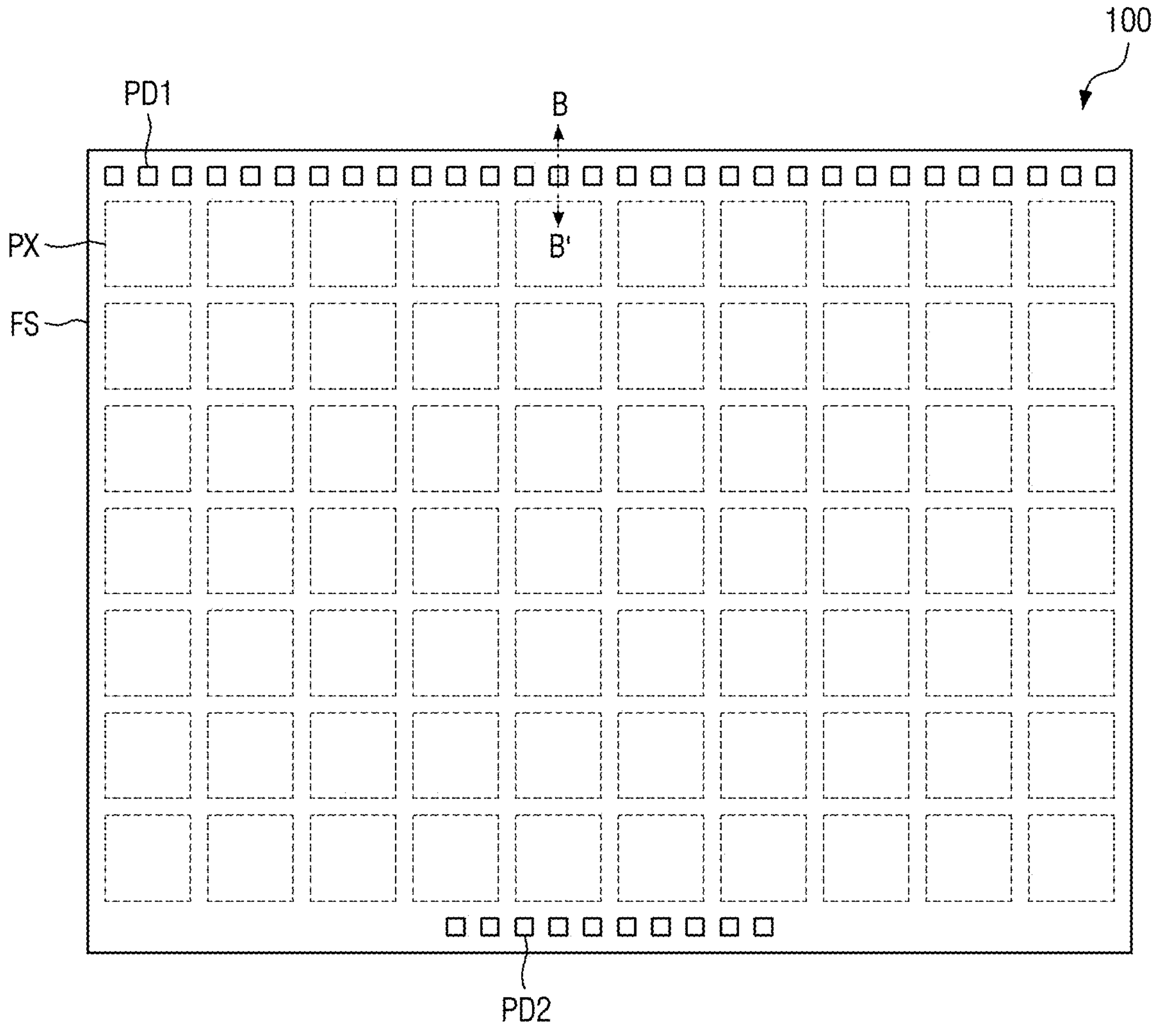
FIG. 2 is a layout diagram illustrating a plurality of pixels, a plurality of first pads, and a plurality of second pads of a display panel according to one or more embodiments.

FIGS. 1A and 1B are perspective views illustrating a display device according to one or more embodiments. FIG. 2 is a layout diagram illustrating a plurality of pixels, a plurality of first pads, and a plurality of second pads of a display panel according to one or more embodiments.

Referring to FIGS. 1A, 1B, and 2, a display device 10 is a device for displaying a moving image or a still image. The display device may be used as a display screen of various products, such as televisions, laptop computers, monitors, billboards and the Internet of Things (IOT) as well as portable electronic devices, such as mobile phones, smart phones, tablet personal computer (tablet PC), smart watches, watch phones, mobile communication terminals, electronic notebooks, electronic books, portable multimedia players (PMPs), navigation systems and ultra mobile PCs (UMPCs).

The display device 10 according to one or more embodiments may include a display panel 100, a circuit board 200, and a source-driving circuit 300.

The display panel 100 may include a substrate SUB, first pads PD1, second pads PD2, first bottom fan-out lines BFL1, second bottom fan-out lines BFL2, a plurality of pixels PX, a plurality of first side wirings SIL1, and a plurality of second side wirings SIL2.

The substrate SUB may include a first surface FS, a second surface BS (e.g., see FIG. 16), a plurality of chamfered surfaces CS1, CS2, CS3, CS4, CS5, CS6, CS7, and/or CS8, and a plurality of side surfaces SS1 to SS8.

The first surface FS may be the front surface of the substrate SUB. The first surface FS may have a rectangular shape having a long side in the first direction DR1, and a short side in the second direction DR2 crossing the first direction DR1.

The second surface BS may be a surface that is opposite to the first surface FS. The second surface BS may be a bottom surface of the substrate SUB. The second surface BS may have a rectangular shape having a long side in the first direction DR1, and a short side in the second direction DR2.

The plurality of chamfered surfaces CS1, CS2, CS3, CS4, CS5, CS6, CS7, and/or CS8 refer to obliquely cut surfaces located between the first surface FS and the plurality of side surfaces SS1 to SS8, and between the second surface BS and the plurality of side surfaces SS1 to SS8, to reduce or prevent the likelihood of a chipping defect occurring in the plurality of first side wirings SIL and the plurality of second side wirings SIL2. Because each of the plurality of first side wirings SIL1 and the plurality of second side wirings SIL2 may have a relatively gentle bending angle due to the plurality of chamfered surfaces CS1, CS2, CS3, CS4, CS5, CS6, CS7, and/or CS8, chipping or cracking of the plurality of first side wirings SIL1 and the plurality of second side wirings SIL2 may be reduced or prevented.

The first chamfered surface CS1 may extend from the first side of the first surface FS, for example, the lower side. The second chamfered surface CS2 may extend from the second side of the first surface FS, for example, the left side. The third chamfered surface CS3 may extend from the third side of the first surface FS, for example, the upper side. The fourth chamfered surface CS4 may extend from the fourth side of the first surface FS, for example, the right side. An interior angle formed by the first surface FS and the first chamfered surface CS1, an interior angle formed by the first surface FS and the second chamfered surface CS2, an interior angle formed by the first surface FS and the third chamfered surface CS3, and an interior angle formed by the first surface FS and the fourth chamfered surface CS4 may be greater than 90 degrees.

The fifth chamfered surface CS5 may extend from the first side of the second surface BS, for example, the lower side. The sixth chamfered surface CS6 may extend from the second side of the second surface BS, for example, the left side. The seventh chamfered surface CS7 may extend from the third side of the second surface BS, for example, the upper side. The eighth chamfered surface CS8 may extend from the fourth side of the second surface BS, for example, the right side. An interior angle formed by the second surface BS and the fifth chamfered surface CS5, an interior angle formed by the second surface BS and the sixth chamfered surface CS6, an interior angle formed by the second surface BS and the seventh chamfered surface CS7, and an interior angle formed by the second surface BS and the eighth chamfered surface CS8 may be greater than 90 degrees.

The first side surface SS1 may extend from the first chamfered surface CS1. The first chamfered surface CS1 may be located between the first surface FS and the first side surface SS1. The first side surface SS1 may be a lower surface of the substrate SUB (e.g., in plan view).

The second side surface SS2 may extend from the second chamfered surface CS2. The second chamfered surface CS2 may be located between the first surface FS and the second side surface SS2. The second side surface SS2 may be the left side of the substrate SUB.

The third side surface SS3 may extend from the third chamfered surface CS3. The third chamfered surface CS3 may be located between the first surface FS and the third side surface SS3. The third side surface SS3 may be an upper surface of the substrate SUB (e.g., in plan view).

The fourth side surface SS4 may extend from the fourth chamfered surface CS4. The fourth chamfered surface CS4 may be located between the first surface FS and the fourth side surface SS4. The fourth side surface SS4 may be the right side of the substrate SUB.

A plurality of pixels PX may be located on the first surface FS of the substrate SUB to display an image. The plurality of pixels PX may be arranged in a matrix form in the first and second directions DR1 and DR2. A detailed description of the plurality of pixels PX will be described later with reference to FIG. 4.

The plurality of first side wirings SIL1 may be located on at least one side surface of at least two chamfered surfaces among the first surface FS, the second surface BS, and/or the plurality of chamfered surfaces CS1, CS2, CS3, CS4, CS5, CS6, CS7, and/or CS8, and may be located on at least one of the plurality of side surfaces SS1, SS2, SS3, and/or SS4. For example, the plurality of first side wirings SIL1 may be located on the first surface FS, the second surface BS, the first chamfered surface CS1, the fifth chamfered surface CS5, and the first side surface SS1 to connect the first pads PD1 located on the first side of the first surface FS and the first bottom fan-out lines BFL1 of the second surface BS.

The plurality of second side wirings SIL2 may be located on at least one side surface of at least two chamfered surfaces among the first surface FS, the second surface BS, and/or the plurality of chamfered surfaces CS1, CS2, CS3, CS4, CS5, CS6, CS7, and/or CS8, and may be located on at least one of the plurality of side surfaces SS1, SS2, SS3, and/or SS4. For example, the plurality of second side wirings SIL2 may be located on the first surface FS, the second surface BS, the third chamfered surface CS3, the seventh chamfered surface CS7, and the third side surface SS3 to connect the second pads PD2, which are located on the second side that is opposite to the first side of the first surface FS, and the second back fan-out lines BFL2 of the second surface BS.

Each of the plurality of first side wirings SIL1 connects the first pads PD1, which are located on the first surface FS, and the first bottom fan-out lines BFL1 that are located on the second surface BS. Each of the plurality of second side wirings SIL2 connects the second pads PD2, which are located on the first surface FS, and the second bottom fan-out lines BFL2 that are located on the second surface BS. The first pads PD1 and the second pads PD2 may correspond to front pads. The first pads PD1 may be connected to data lines connected to the pixels PX of the substrate SUB. Some of the second pads PD2 may be connected to the first power supply line located on the first surface FS of the substrate SUB, and another part may be connected to the global power supply line located on the first surface FS of the substrate SUB.

A plurality of first circuit boards 200 may be located on the second surface BS of the substrate SUB. Each of the plurality of first circuit boards 200 may be connected to the first bottom fan-out lines BFL1, which are located on the second surface BS of the substrate SUB, by using a conductive adhesive member, such as an anisotropic conductive film. The plurality of first circuit boards 200 may be electrically connected to the first pads PD1 through the first bottom fan-out lines BFL1 and the plurality of first side wirings SIL1. The plurality of first circuit boards 200 may be flexible printed circuit boards, printed circuit boards, or flexible films.

A second circuit board 400 may be located on the second surface BS of the substrate SUB. The second circuit board 400 may be connected to the second bottom fan-out lines BFL2, which are located on the second surface BS of the substrate SUB, by using the conductive adhesive member. The second circuit board 400 may be connected to the second pads PD2 through the second bottom fan-out lines BFL2 and the plurality of second side wirings SIL2. The second circuit board 400 may be the flexible printed circuit board, the printed circuit board, or the flexible film.

Each of the source-driving circuits 300 may generate data voltages, and may supply them to data lines through the first circuit board 200, the first back fan-out lines BFL1, the plurality of first side wirings SIL1, and the first pad PD1.

Each of the source-driving circuits 300 may be formed as an integrated circuit (IC), and may be attached to a corresponding circuit board 200. Alternatively, the source-driving circuit 300 may be directly attached to the second surface BS of the substrate SUB using a chip-on-glass (COG) method.

A power supply circuit 500 may generate and supply voltages (e.g., predetermined voltages) to voltage lines (e.g., predetermined voltage lines) through the second circuit board 400, the second back fan-out lines BFL2, the plurality of second side wirings SIL2, and the second pads PD2. For example, the power supply circuit 500 may generate a first power voltage, and may supply the first power voltage to the first power line through the second circuit board 400, the second back fan-out lines BFL2, the plurality of second side wirings SIL2, and the second pads PD2. In addition, the power supply circuit 500 may generate a global power voltage GV, and may supply the global power voltage GV to the global power line through the second circuit board 400, the second back fan-out lines BFL2, the plurality of second side wirings SIL2, and the second pads PD2. The power supply circuit 500 may be formed as the integrated circuit (IC), and may be attached to the second circuit board 400. Alternatively, the power supply circuit 500 may be directly attached to the second surface BS of the substrate SUB using the chip-on-glass (COG) method.

As shown in FIGS. 1A, 1B, and 2, the flexible film bent along the side of the substrate SUB may be removed by connecting the first pads PD1 located on the first surface FS and the second pads PD2 located on the second surface BS by using the plurality of first side wirings SIL1 and the plurality of second side wirings SIL2. As a result, an effectively bezel-less display device may be implemented.

Figure 3:
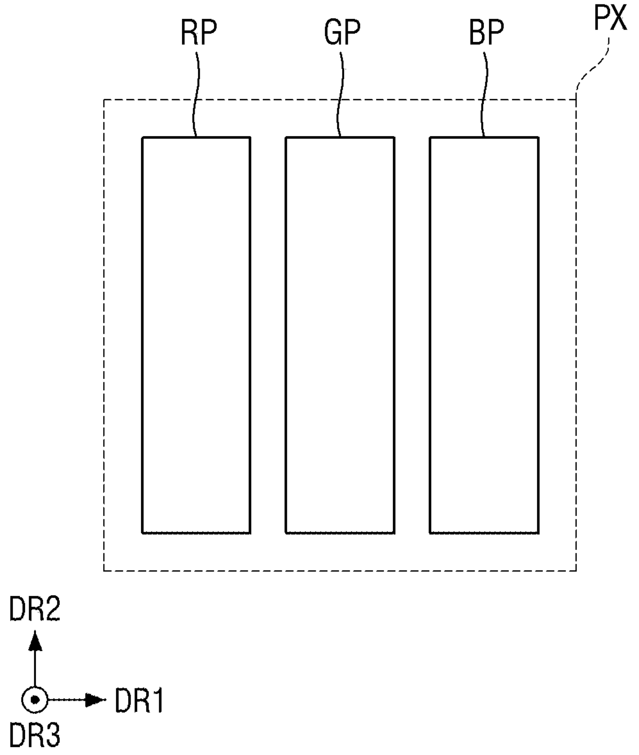
FIG. 3 is a layout diagram illustrating first to third sub-pixels of a pixel according to one or more embodiments.

FIG. 3 is a layout diagram illustrating first to third sub-pixels of a pixel according to one or more embodiments.

Referring to FIG. 3, each of the pixels PX may include a plurality of sub-pixels RP, GP, and BP. In FIG. 3, it is shown that each of the pixels PX includes three sub-pixels RP, GP, and BP, that is, a first sub-pixel RP, a second sub-pixel GP, and a third sub-pixel BP, but the present disclosure is not limited thereto. Each of the first sub-pixel RP, the second sub-pixel GP, and the third sub-pixel BP may be connected to at least one of the PWM data lines DL, at least one of the first to third data lines RDL, GDL, and/or BDL, and/or at least one of the scan lines GWL, GIL, GCL, SWPL, PAEL, and/or PWEL.

Each of the first sub-pixel RP, the second sub-pixel GP, and the third sub-pixel BP may have a rectangular, square, or rhombus planar shape. For example, each of the first sub-pixel RP, the second sub-pixel GP, and the third sub-pixel BP may have a rectangular planar shape having a short side in the first direction DR1 and a long side in the second direction DR2. Alternatively, each of the first sub-pixel RP, the second sub-pixel GP, and the third sub-pixel BP may have a planar shape of a square or rhombus including sides having the same length in the first direction DR1 and the second direction DR2.

As shown in FIG. 3, the first sub-pixel RP, the second sub-pixel GP, and the third sub-pixel BP may be arranged in the first direction DR1. Alternatively, one of the second sub-pixel GP and the third sub-pixel BP and the first sub-pixel RP may be arranged in the first direction DR1, and the other one and the first sub-pixel RP may be arranged in the second direction DR2. For example, the first sub-pixel RP and the second sub-pixel GP may be arranged in the first direction DR1, and the first sub-pixel RP and the third sub-pixel BP may be arranged in the second direction DR2. Alternatively, one of the first sub-pixel RP and the third sub-pixel BP and the second sub-pixel GP may be arranged in the first direction DR1, and the other one and the third sub-pixel BP may be arranged in the second direction DR2.

The first sub-pixel RP may emit first light, the second sub-pixel GP may emit second light, and the third sub-pixel BP may emit third light. Here, the first light may be light in a red wavelength band, the second light may be light in a green wavelength band, and the third light may be light in a blue wavelength band. The red wavelength band may be a wavelength band of about 600 nm to about 750 nm, the green wavelength band may be a wavelength band of about 480 nm to about 560 nm, and the blue wavelength band may be a wavelength band of about 370 nm to about 460 nm, but the present disclosure is not limited thereto.

Each of the first sub-pixel RP, the second sub-pixel GP, and the third sub-pixel BP may include an inorganic light-emitting element having an inorganic semiconductor as a light-emitting element for emitting light. For example, the inorganic light-emitting element may be a flip chip type micro light-emitting diode (LED), but the present disclosure is not limited thereto.

As shown in FIG. 3, the area of the first sub-pixel RP, the area of the second sub-pixel GP, and the area of the third sub-pixel BP may be substantially the same, but the present disclosure is not limited thereto. At least one of the area of the first sub-pixel RP, the area of the second sub-pixel GP, and the area of the third sub-pixel BP may be different from the other one. Alternatively, any two of the area of the first sub-pixel RP, the area of the second sub-pixel GP, and the area of the third sub-pixel BP may be substantially the same, and the other one may be different from the above two. Alternatively, the area of the first sub-pixel RP, the area of the second sub-pixel GP, and the area of the third sub-pixel BP may be different from each other.

Figure 4:
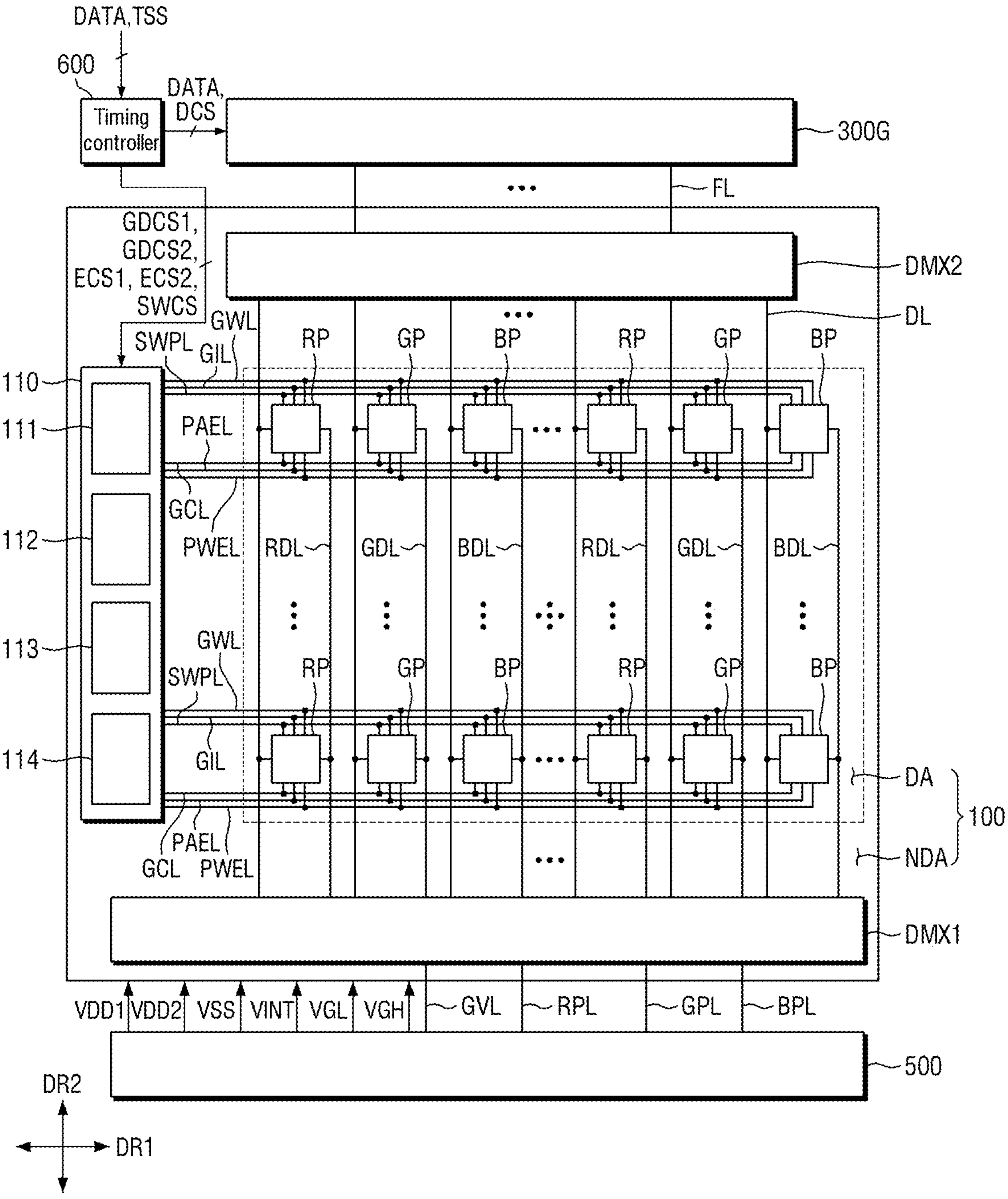
FIG. 4 is a block diagram illustrating a display device according to one or more embodiments.

FIG. 4 is a block diagram illustrating a display device according to one or more embodiments.

Referring to FIG. 4, the display device 10 includes a display panel 100, a scan-driving circuit 110, a data-driving circuit 300G, a timing control circuit 600, and a power supply circuit 500.

A display area DA of the display panel 100 may include sub-pixels RP, GP, and BP for displaying an image, scan write lines GWL connected to the sub-pixels RP, GP, and BP, scan initialization lines GIL, scan control lines GCL, sweep signal lines SWPL, PWM light-emitting lines PWEL, PAM light-emitting lines PAEL, PWM data lines DL, first data lines RDL, second data lines GDL, and third data lines BDL.

The scan write lines GWL, scan initialization lines GIL, scan control lines GCL, sweep signal lines SWPL, PWM light-emitting lines PWEL, and PAM light-emitting lines PAEL may be extended in the first direction (X-axis direction), and may be arranged in the second direction (Y-axis direction) crossing the first direction (X-axis direction). The PWM data lines DL, the first data lines RDL, the second data lines GDL, and the third data lines BDL may be extended in the second direction (Y-axis direction), and may be arranged in the first direction (X-axis direction). The first data lines RDL may be electrically connected to each other, the second data lines GDL may be electrically connected to each other, and the third data lines BDL may be electrically connected to each other.

The sub-pixels RP, GP, and BP may include first sub-pixels RP for emitting a first light, second sub-pixels GP for emitting a second light, and third sub-pixels BP for emitting a third light. The first light indicates light in a red wavelength band, the second light indicates light in a green wavelength band, and the third light indicates light in a blue wavelength band. For example, the main peak wavelength of the first light may be at about 600 nm to about 750 nm, the main peak wavelength of the second light may be at about 480 nm to about 560 nm, and the main peak wavelength of the third light may be at about 370 nm to about 460 nm.

Each of the sub-pixels RP, GP, and BP may be connected to one of the scan write lines GWL, one of the scan initialization lines GIL, one of the scan control lines GCL, one of the sweep signal lines SWPL, one of the PWM light-emitting lines PWEL, and one of the PAM light-emitting lines PAEL. Also, each of the first sub-pixels RP may be connected to one of the PWM data lines DL and one of the first data lines RDL. Also, each of the second sub-pixels GP may be connected to one of the PWM data lines DL and one of the second data lines GDL. Also, each of the third sub-pixels BP may be connected to one of the PWM data lines DL and one of the third data lines BDL.

A non-display area NDA of the display panel 100 may include a scan-driving circuit 110, a first demultiplexer DMX1, and a second demultiplexer DMX2.

The scan-driving circuit 110 may be located on the display panel 100 to apply signals to scan write lines GWL, scan initialization lines GIL, scan control lines GCL, sweep signal lines SWPL, the PWM light-emitting lines PWEL, and the PAM light-emitting lines PAEL. FIGS. 1A and 1B illustrate that the scan-driving circuit 110 is located at one edge of the display panel 100, but the present disclosure is not limited thereto. The scan-driving circuit 110 may be located on both edges of the display panel 100.

The scan-driving circuit 110 may include a first scan-signal-driving circuit 111, a second scan-signal-driving circuit 112, a sweep-signal-driving circuit 113, and a light-emission-signal-driving circuit 114.

The first scan-signal-driving circuit 111 may receive a first scan-driving control signal GDCS1 from the timing control circuit 600. The first scan-signal-driving circuit 111 may output scan initialization signals to scan initialization lines GIL, and may output scan write signals to scan write lines GWL, according to the first scan-driving control signal GDCS1. That is, the first scan-signal-driving circuit 111 may output two scan signals, that is, scan initialization signals and scan write signals together.

The second scan-signal-driving circuit 112 may receive the second scan-driving control signal GDCS2 from the timing control circuit 600. The second scan-signal-driving circuit 112 may output scan control signals to the scan control lines GCL according to the second scan-driving control signal GDCS2.

The sweep-signal-driving circuit 113 may receive a first emission control signal ECS1 and a sweep control signal SWCS from the timing control circuit 600. The sweep-signal-driving circuit 113 may output PWM light-emitting signals to the PWM light-emitting lines PWEL and may output sweep signals to the sweep signal lines SWPL according to the first emission control signal ECS1. That is, the sweep-signal-driving circuit 113 may output PWM light-emitting signals and sweep signals together.

The light-emission-signal-driving circuit 114 may receive a second emission control signal ECS2 from the timing control circuit 600. The light-emission-signal-driving circuit 114 may output PAM light-emitting signals to the PAM light-emitting lines PAEL according to the second light emission control signal ECS2.

The first demultiplexer DMX1 switches the connection between each PWM data line DL and the global power line GVL. In addition, the first demultiplexer DMX1 switches the connection between each first data line RDL and a first data voltage line RPL, switches the connection between each second data line GDL and the second data voltage line GPL, and switches the connection between each third data line BDL and the third data voltage line BPL.

The second demultiplexer DMX2 may be located between the fan-out lines FL and the PWM data lines DL. The second demultiplexer DMX2 may distribute the PWM data voltages applied to each fan-out line FL to Q PWM data lines DL, or to Q first to third data lines RDL, GDL, and BDL, Q being an integer greater than or equal to 2.

The first demultiplexer DMX1 may be located adjacent to the second pads PD2, and the second demultiplexer DMX2 may be located adjacent to the first pads PD1. That is, the first demultiplexer DMX1 may be located adjacent to one side of the display panel 100, for example, a lower side of the display panel 100. The second demultiplexer DMX2 may be located adjacent to the other side of the display panel 100, for example, an upper side of the display panel 100.

A detailed description of the first demultiplexer DMX1 and the second demultiplexer DMX2 will be described later with reference to FIG. 6.

The timing control circuit 600 receives digital video data DATA and timing signals TSS. The timing control circuit 600 may generate the first scan-driving control signal GDCS1, a second scan-driving control signal GDCS2, the first light emission control signal ECS1, the second light emission control signal ECS2, and a sweep control signal SWCS for controlling the operation timing of the scan-driving circuit 110 according to the timing signals TSS. Also, the timing control circuit 600 may generate a source control signal DCS for controlling the operation timing of the data-driving circuit 300G.

The timing control circuit 600 outputs the first scan-driving control signal GDCS1, the second scan-driving control signal GDCS2, the first emission control signal ECS1, the second emission control signal ECS2, and the sweep control signal SWCS to the scan-driving circuit 110. The timing control circuit 600 outputs the digital video data DATA and the PWM control signal DCS to the data-driving circuit 300G.

The data-driving circuit 300G may include a plurality of source-driving circuits 300. The data-driving circuit 300G converts the digital video data DATA into analog PWM data voltages, and outputs them to the fan-out lines FL.

The power supply circuit 500 may generate and output a first data voltage to the first data voltage line RPL, may generate and output a second data voltage to the second data voltage line GPL, and may generate and output a third data voltage to the third data voltage line BPL. The power supply circuit 500 may generate and output the global power voltage GV to the global power line GVL.

In addition, the power supply circuit 500 may generate and output a plurality of power voltages to the display panel 100. For example, the power supply circuit 500 may output a first power voltage VDD1, a second power supply voltage VDD2, a third power voltage VSS, an initialization voltage VINT, a gate-on voltage VGL, and a gate-off voltage VGH to the display panel 100. The first power voltage VDD1 and the second power supply voltage VDD2 may be high potential driving voltages for driving light-emitting elements of each of the sub-pixels RP, GP, and BP. The third power voltage VSS may be a low potential driving voltage for driving light-emitting elements of each of the sub-pixels RP, GP, and BP. The initialization voltage VINT and the gate-off voltage VGH are applied to each of the sub-pixels RP, GP, and BP, and the gate-on voltage VGL and the gate-off voltage VGH may be applied to the scan-driving circuit 110.

Figure 5:
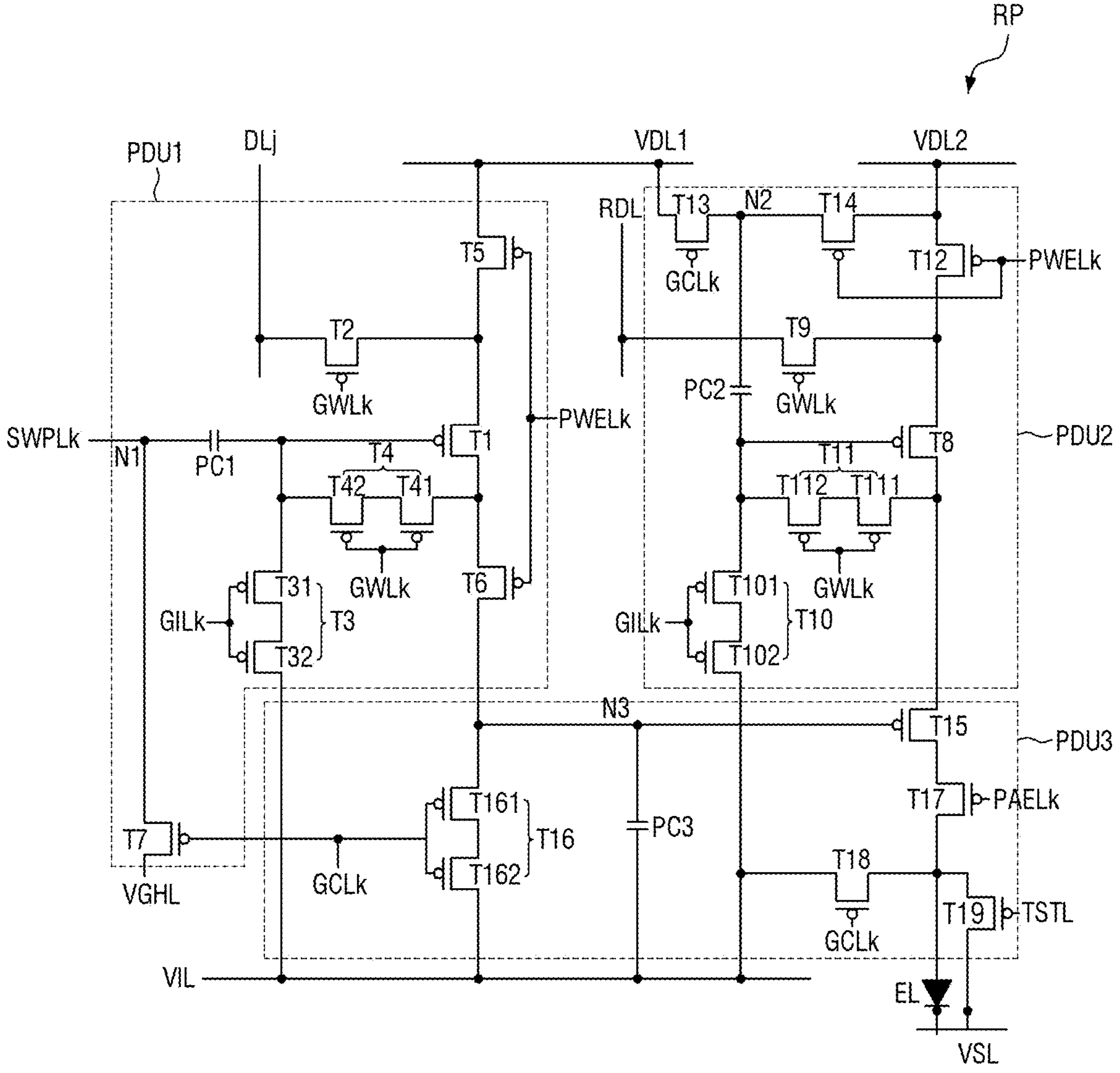
FIG. 5 is a circuit diagram illustrating a first sub-pixel according to one or more embodiments.

FIG. 5 is a circuit diagram illustrating a first sub-pixel according to one or more embodiments.

Referring to FIG. 5, the first sub-pixel RP according to one or more embodiments may be connected to a $k^{th}$ scan write line GWLk, a $k^{th}$ scan initialization line GILk, a $k^{th}$ scan control line GCLk, a $k^{th}$ sweep signal line SWPLK, a $k^{th}$ PWM light-emitting line PWELK, and a $k^{th}$ PAM light-emitting line PAELk. Also, the first sub-pixel RP may be connected to the $j^{th}$ PWM data line DLj and the first data line RDL. In addition, the first sub-pixel RP may be connected to the first power supply line VDL1 to which the first power voltage VDD1 is applied, the second power supply line VDL2 to which the second power supply voltage VDD2 is applied, a third power supply line VSL to which a third power supply voltage VSS is applied, an initialization voltage line VIL to which an initialization voltage VINT is applied, and a gate-off voltage line VGHL to which the gate-off voltage VGH is applied. Meanwhile, the $j^{th}$ PWM data line DLj may be referred to as a first data line, and the first data line RDL may be referred to as a second data line for convenience of description.

The first sub-pixel RP may include a light-emitting element EL, a first pixel-driving circuit PDU1, a second pixel-driving circuit PDU2, and a third pixel-driving circuit PDU3.

The light-emitting element EL emits light according to a driving current generated by the second pixel-driving circuit PDU2. The light-emitting element EL may be located between the seventeenth transistor T17 and the third power supply line VSL. A first electrode of the light-emitting element EL may be connected to the second electrode of the seventeenth transistor T17, and the electrode of the light-emitting element EL may be connected to the third power supply line VSL. The first electrode of the light-emitting element EL may be an anode electrode, and the second electrode may be a cathode electrode. A light-emitting element EL may be an inorganic light-emitting element including the first electrode, the second electrode, and an inorganic semiconductor located between the first electrode and the second electrode. For example, the light-emitting element EL may be a micro light-emitting diode formed of the inorganic semiconductor, but the present disclosure is not limited thereto.

The first pixel-driving circuit PDU1 generates a control current according to the $j^{th}$ PWM data voltage of the $j^{th}$ PWM data line DLj to control a voltage of a third node N3 of the third pixel-driving circuit PDU3. Because a pulse width of the first driving current flowing through the light-emitting element EL may be adjusted by the control current of the first pixel-driving circuit PDU1, the first pixel-driving circuit PDU1 may be a pulse width modulation PWM circuit for performing pulse width modulation of the first driving current flowing through the light-emitting element EL.

The first pixel-driving circuit PDU1 may include the first to seventh transistors T1 to T7 and a first capacitor PC1.

The first transistor T1 controls the control current flowing between the second electrode and the first electrode according to the PWM data voltage applied to a gate electrode.

The second transistor T2 is turned on by a $k^{th}$ scan write signal of a $k^{th}$ scan write line GWLk to supply the PWM data voltage of the $j^{th}$ PWM data line DLj to the first electrode of the first transistor T1. The gate electrode of the second transistor T2 may be connected to the $k^{th}$ scan write line GWLk, the first electrode thereof may be connected to the $j^{th}$ PWM data line DLj, and the second electrode thereof may be connected to the first electrode of the first transistor T1.

The third transistor T3 is turned on by a $k^{th}$ scan initialization signal of the $k^{th}$ scan initialization line GILk to connect the initialization voltage line VIL to the gate electrode of the first transistor T1. In this case, the gate-on voltage VGL of the $k^{th}$ scan initialization signal may be different from the initialization voltage VINT of the initialization voltage line VIL. Because the difference between the gate-on voltage VGL and the initialization voltage VINT is greater than the threshold voltage of the third transistor T3, the third transistor T3 may be stably turned on even after the initialization voltage VINT is applied to the gate electrode of the first transistor T1. Accordingly, when the third transistor T3 is turned on, the initialization voltage VINT may be stably applied to the gate electrode of the first transistor T1 regardless of the threshold voltage of the third transistor T3.

The third transistor T3 may include a plurality of transistors connected in series. For example, the third transistor T3 may include a first sub-transistor T31 and a second sub-transistor T32. Accordingly, it is possible to reduce or prevent the likelihood of the voltage of the gate electrode of the first transistor T1 leaking through the third transistor T3. The gate electrode of the first sub-transistor T31 may be connected to the $k^{th}$ scan initialization line GILk, the first electrode thereof may be connected to the gate electrode of the first transistor T1, and the second electrode thereof may be connected to the first electrode of the second sub-transistor T32. The gate electrode of the second sub-transistor T32 may be connected to the $k^{th}$ scan initialization line GILk, the first electrode thereof may be connected to the second electrode of the first sub-transistor T31, and the second electrode thereof may be connected to the initialization voltage line VIL.

The fourth transistor T4 is turned on by the $k^{th}$ scan write signal of the $k^{th}$ scan write line GWLk to connect the gate electrode to the second electrode of the first transistor T1. Accordingly, the first transistor T1 may operate as a diode while the fourth transistor T4 is turned on.

The fourth transistor T4 may include the plurality of transistors connected in series. For example, the fourth transistor T4 may include a third sub-transistor T41 and a fourth sub-transistor T42. Accordingly, it is possible to reduce or prevent the likelihood of the voltage of the gate electrode of the first transistor T1 leaking through the fourth transistor T4. The gate electrode of the third sub-transistor T41 may be connected to the $k^{th}$ scan write line GWLk, the first electrode thereof may be connected to the second electrode of the first transistor T1, and the second electrode thereof may be connected to the first electrode of the fourth sub transistor T42. The gate electrode of the fourth sub-transistor T42 may be connected to the $k^{th}$ scan write line GWLk, the first electrode thereof may be connected to the second electrode of the third sub-transistor T41, and the second electrode thereof may be connected to the gate electrode of the first transistor T1.

The fifth transistor T5 is turned on by the $k^{th}$ PWM light-emitting signal of the $k^{th}$ PWM light-emitting line PWELK to connect the first electrode of the first transistor T1 to the first power supply line VDL1. The gate electrode of the fifth transistor T5 may be connected to the $k^{th}$ PWM light-emitting line PWELK, the first electrode thereof may be connected to the first power supply line VDL1, and the second electrode thereof may be connected to the first electrode of the first transistor T1.

The sixth transistor T6 is turned on by the $k^{th}$ PWM light-emitting signal of the $k^{th}$ PWM light-emitting line PWELK to connect the second electrode of the first transistor T1 to the third node of the third pixel-driving circuit PDU3. The gate electrode of the sixth transistor T6 may be connected to the $k^{th}$ PWM light-emitting line PWELK, the first electrode thereof may be connected to the second electrode of the first transistor T1, and the second electrode thereof may be connected to the third node N3 of the third pixel-driving circuit PDU3.

The seventh transistor T7 is turned on by the $k^{th}$ scan control signal of the $k^{th}$ scan control line GCLk to supply the gate-off voltage VGH of the gate-off voltage line VGHL to the first node N1 connected to the $k^{th}$ sweep signal line SWPLK. Accordingly, a voltage change of the gate electrode of the first transistor T1 may be reduced or prevented from being reflected to the $k^{th}$ sweep signal of the $k^{th}$ sweep signal line SWPLK due to the first capacitor PC1 during the period in which the initialization voltage VINT is applied to the gate electrode of the first transistor T1 and during the period in which the PWM data voltage of the $j^{th}$ PWM data line DLj and the threshold voltage of the first transistor T1 are programmed. The gate electrode of the seventh transistor T7 may be connected to the $k^{th}$ scan control line GCLk, the first electrode thereof may be connected to the gate-off voltage line VGHL, and the second electrode thereof may be connected to the first node N1.

The first capacitor PC1 may be located between the gate electrode of the first transistor T1 and the first node N1. One electrode of the first capacitor PC1 may be connected to the gate electrode of the first transistor T1, and the other electrode thereof may be connected to the first node N1.

The first node N1 may be a contact point of the $k^{th}$ sweep signal line SWPLK, of the second electrode of the seventh transistor T7, and of the other electrode of the first capacitor PC1.

The second pixel-driving circuit PDU2 generates the driving current applied to the light-emitting element EL according to the first PWM data voltage of the first data line RDL. The second pixel-driving circuit PDU2 may be a pulse amplitude modulator that performs pulse amplitude modulation. The second pixel-driving circuit PDU2 may be a constant current generator for generating a constant driving current according to the first PWM data voltage.

In addition, the second pixel-driving circuit PDU2 of each of the first sub-pixels RP may receive the same first PWM data voltage, and may generate the same driving current regardless of the luminance of the first sub-pixel RP. Similarly, the second pixel-driving circuit PDU2 of each of the second sub-pixels GP may receive the same second PWM data voltage, and may generate the same driving current regardless of the luminance of the second sub-pixel GP. The third pixel-driving circuit PDU3 of each of the third sub-pixels BP may receive the same third PWM data voltage, and may generate the same driving current regardless of the luminance of the third sub-pixel BP.

The second pixel-driving circuit PDU2 may include eighth to fourteenth transistors T8 to T14 and a second capacitor PC2.

The eighth transistor T8 controls the driving current flowing to the light-emitting element EL according to the voltage applied to the gate electrode.

The ninth transistor T9 is turned on by a $k^{th}$ scan write signal of a $k^{th}$ scan write line GWLk to supply the first PWM data voltage of the first data line RDL to the first electrode of the eighth transistor T8. The gate electrode of the ninth transistor T9 may be connected to the $k^{th}$ scan write line GWLk, the first electrode thereof may be connected to the first data line RDL, and the second electrode thereof may be connected to the first electrode of the eighth transistor T8.

The tenth transistor T10 is turned on by a $k^{th}$ scan initialization signal of a $k^{th}$ scan initialization line GILk to connect the initialization voltage line VIL to the gate electrode of the eighth transistor T8. Accordingly, the gate electrode of the eighth transistor T8 may be discharged to the initialization voltage VINT of the initialization voltage line VIL during the turned-on period of the tenth transistor T10. In this case, the gate-on voltage VGL of the $k^{th}$ scan initialization signal may be different from the initialization voltage VINT of the initialization voltage line VIL. Because the difference between the gate-on voltage VGL and the initialization voltage VINT is greater than the threshold voltage of the tenth transistor T10, the tenth transistor T10 may be stably turned on even after the initialization voltage VINT is applied to the gate electrode of the eighth transistor T8. Accordingly, when the tenth transistor T10 is turned on, the initialization voltage VINT may be stably applied to the gate electrode of the eighth transistor T8 regardless of the threshold voltage of the tenth transistor T10.

The tenth transistor T10 may include the plurality of transistors connected in series. For example, the tenth transistor T10 may include a fifth sub-transistor T101 and a sixth sub-transistor T102. Accordingly, it is possible to reduce or prevent the likelihood of the voltage of the gate electrode of the eighth transistor T8 leaking through the tenth transistor T10. The gate electrode of the fifth sub-transistor T101 may be connected to the $k^{th}$ scan initialization line GILk, the first electrode thereof may be connected to the gate electrode of the eighth transistor T8, and the second electrode thereof may be connected to the first electrode of the sixth sub transistor T102. The gate electrode of the sixth sub-transistor T102 may be connected to the $k^{th}$ scan initialization line GILk, the first electrode thereof may be connected to the second electrode of the fifth sub-transistor T101, and the second electrode thereof may be connected to the initialization voltage line VIL.

The eleventh transistor T11 is turned on by the $k^{th}$ scan write signal of the $k^{th}$ scan write line GWLk, and connects the gate electrode to the second electrode of the eighth transistor T8. Accordingly, the eighth transistor T8 may operate as a diode while the eleventh transistor T11 is turned on.

The eleventh transistor T11 may include the plurality of transistors connected in series. For example, the eleventh transistor T11 may include a seventh sub-transistor T111 and an eighth sub-transistor T112. Accordingly, it is possible to reduce or prevent the likelihood of the voltage of the gate electrode of the eighth transistor T8 leaking through the eleventh transistor T11. The gate electrode of the seventh sub-transistor T111 may be connected to the $k^{th}$ scan write line GWLk, the first electrode thereof may be connected to the second electrode of the eighth transistor T8, and the second electrode thereof may be connected to the first electrode of the eighth sub transistor T112. The gate electrode of the eighth sub-transistor T112 may be connected to the $k^{th}$ scan write line GWLk, the first electrode thereof may be connected to the second electrode of the seventh sub-transistor T111, and the second electrode thereof may be connected to the gate electrode of the eighth transistor T8.

The twelfth transistor T12 is turned on by the $k^{th}$ PWM light-emitting signal of the $k^{th}$ PWM light-emitting line PWELK to connect the first electrode of the eighth transistor T8 to the second power supply line VDL2. The gate electrode of the twelfth transistor T12 may be connected to the $k^{th}$ PWM light-emitting line PWELK, the first electrode thereof may be connected to the second power line supply VDL2, and the second electrode thereof may be connected to the first electrode of the eighth transistor T8.

The thirteenth transistor T13 is turned on by the $k^{th}$ scan control signal of the $k^{th}$ scan control line GCLk and connects the first power supply line VDL1 to the second node N2. The gate electrode of the thirteenth transistor T13 may be connected to the $k^{th}$ scan control line GCLK, the first electrode thereof may be connected to the first power supply line VDL1, and the second electrode thereof may be connected to the second node N2.

The fourteenth transistor T14 is turned on by the $k^{th}$ PWM light-emitting signal of the $k^{th}$ PWM light-emitting line PWELK, and connects the second power supply line VDL2 to the second node N2. Accordingly, when the fourteenth transistor T14 is turned on, the second power supply voltage VDD2 of the second power supply line VDL2 may be supplied to the second node N2. The gate electrode of the fourteenth transistor T14 may be connected to the $k^{th}$ PWM light-emitting line PWELK, the first electrode thereof may be connected to the second power supply line VDL2, and the second electrode thereof may be connected to the second node N2.

The second capacitor PC2 may be located between the gate electrode of the eighth transistor T8 and the second node N2. One electrode of the second capacitor PC2 may be connected to the gate electrode of the eighth transistor T8, and the other electrode thereof may be connected to the second node N2.

The second node N2 may be the contact point of the second electrode of the thirteenth transistor T13, of the second electrode of the fourteenth transistor T14, and of the other electrode of the second capacitor PC2.

The third pixel-driving circuit PDU3 adjusts the period in which the driving current is applied to the light-emitting element EL according to the voltage of the third node N3.

The third pixel-driving circuit PDU3 may include fifteenth to nineteenth transistors T15 to T19 and a third capacitor PC3.

The fifteenth transistor T15 is turned on or turned off depending on the voltage of the third node N3. When the fifteenth transistor T15 is turned on, the driving current of the eighth transistor T8 may be supplied to the light-emitting element EL. Also, when the fifteenth transistor T15 is turned off, the driving current of the eighth transistor T8 may not be supplied to the light-emitting element EL. Therefore, the turned-on period of the fifteenth transistor T15 may be substantially the same as the emission period of the light-emitting element EL. The gate electrode of the fifteenth transistor T15 may be connected to the third node N3, the first electrode thereof may be connected to the second electrode of the eighth transistor T8, and the second electrode thereof may be connected to the first electrode of the seventeenth transistor T17.

The sixteenth transistor T16 is turned on by the $k^{th}$ scan control signal of the $k^{th}$ scan control line GCLk to connect the initialization voltage line VIL to the third node N3. Accordingly, the third node N3 may be discharged to the initialization voltage of the initialization voltage line VIL during the turned-on period of the sixteenth transistor T16.

The sixteenth transistor T16 may include the plurality of transistors connected in series. For example, the sixteenth transistor T16 may include a ninth sub-transistor T161 and a tenth sub-transistor T162. Accordingly, it is possible to reduce or prevent the likelihood of the voltage of the third node N3 leaking through the sixteenth transistor T16. The gate electrode of the ninth sub-transistor T161 may be connected to the $k^{th}$ scan control line GCLk, the first electrode thereof may be connected to the third node N3, and the second electrode thereof may be connected to the first electrode of the tenth sub-transistor T162. The gate electrode of the tenth sub-transistor T162 may be connected to the $k^{th}$ scan control line GCLK, the first electrode thereof may be connected to the second electrode of the ninth sub-transistor T161, and the second electrode thereof may be connected to the initialization voltage line VIL.

The seventeenth transistor T17 is turned on by a $k^{th}$ PAM emission signal of the $k^{th}$ PAM light-emitting line PAELk to connect the second electrode of the fifteenth transistor T15 to the first electrode of the light-emitting element EL. The gate electrode of the seventeenth transistor T17 may be connected to the $k^{th}$ PAM light-emitting line PAELk, the first electrode thereof may be connected to the second electrode of the fifteenth transistor T15, and the second electrode thereof may be connected to the first electrode of the light-emitting element EL.

The eighteenth transistor T18 is turned on by the $k^{th}$ scan control signal of the $k^{th}$ scan control line GCLk to connect the initialization voltage line VIL to the first electrode of the light-emitting element EL. Accordingly, the first electrode of the light-emitting element EL may be discharged to the initialization voltage of the initialization voltage line VIL during the turned-on period of the eighteenth transistor T18. The gate electrode of the eighteenth transistor T18 may be connected to the $k^{th}$ scan control line GCLK, the first electrode thereof may be connected to the first electrode of the light-emitting element EL, and the second electrode thereof may be connected to the initialization voltage line VIL.

The nineteenth transistor T19 is turned on by a test signal of a test signal line TSTL to connect the first electrode of the light-emitting element EL to the third power supply line VSL. The gate electrode of the nineteenth transistor T19 may be connected to the test signal line TSTL, the first electrode thereof may be connected to the first electrode of the light-emitting element EL, and the second electrode thereof may be connected to the third power supply line VSL.

The third capacitor PC3 may be located between the third node N3 and the initialization voltage line VIL. One electrode of the third capacitor PC3 may be connected to the third node N3, and the other electrode thereof may be connected to the initialization voltage line VIL.

The third node N3 may be the contact point of the second electrode of the sixth transistor T6, of the gate electrode of the fifteenth transistor T15, of the first electrode of the ninth sub-transistor T161, and of one electrode of the third capacitor PC3.

One of the first electrode and the second electrode of each of the first to nineteenth transistors T1 to T19 may be a source electrode, and the other may be a drain electrode. The active layer of each of the first to nineteenth transistors T1 to T19 may be formed of one of poly silicon, amorphous silicon, and an oxide semiconductor. When the active layer of each of the first to nineteenth transistors T1 to T19 is polysilicon, it may be formed through a low temperature polysilicon (LTPS) process.

In addition, in FIG. 2, it has been mainly described that each of the first to nineteenth transistors T1 to T19 is formed of a P-type MOSFET, but the present disclosure is not limited thereto. For example, each of the first to nineteenth transistors T1 to T19 may be formed of an N-type MOSFET.

The first sub-transistor T31 and the second sub-transistor T32 of the third transistor T3, the third sub-transistor T41 and the fourth sub-transistor T42 of the fourth transistor T4, the fifth sub-transistor T101 and the sixth sub-transistor T102 of the tenth transistor T10, and the seventh sub-transistor T111 and the eighth sub-transistor T112 of the eleventh transistor T11 in the first sub-pixel RP may be formed of the N-type MOSFET to increase the ability of the light-emitting element EL to express black by blocking leakage current. In this case, the gate electrode of the third sub-transistor T41 and the gate electrode of the fourth sub-transistor T42 of the fourth transistor T, and the gate electrode of the seventh sub-transistor T111 and the gate electrode of the eighth sub-transistor T112 of the eleventh transistor T11, may be connected to the $k^{th}$ control signal. The $k^{th}$ scan initialization signal GILk and the $k^{th}$ control signal may have pulses generated as gate-off voltages VGH. In addition, the first sub-transistor T31 and the second sub-transistor T32 of the third transistor T3, the third sub-transistor T41 and the fourth sub-transistor T42 of the fourth transistor T4, the fifth sub-transistor T101 and the sixth sub-transistor T102 of the tenth transistor T10, and the seventh sub-transistor T111 and the eighth sub-transistor T112 of the eleventh transistor T11 may be formed of the oxide semiconductor, and the remaining transistors may be formed of polysilicon.

One of the first sub-transistor T31 and the second sub-transistor T32 of the third transistor T3 may be formed of the N-type MOSFET, and the other may be formed of the P-type MOSFET. In this case, a transistor formed of the N-type MOSFET among the first sub-transistor T31 and the second sub-transistor T32 of the third transistor T3 may be formed of the oxide semiconductor, and a transistor formed from the P-type MOSFET may be formed from polysilicon.

One of the third sub-transistor T41 and the fourth sub-transistor T42 of the fourth transistor T4 may be formed of the N-type MOSFET, and the other may be formed of the P-type MOSFET. In this case, a transistor formed of an N-type MOSFET among the third sub-transistor T41 and the fourth sub-transistor T42 of the fourth transistor T4 may be formed of the oxide semiconductor, and a transistor formed of the P-type MOSFET may be formed of polysilicon.

One of the fifth sub-transistor T101 and the sixth sub-transistor T102 of the tenth transistor T10 may be formed of the N-type MOSFET, and the other may be formed of the P-type MOSFET. In this case, a transistor formed of the N-type MOSFET among the fifth sub-transistor T101 and the sixth sub-transistor T102 of the tenth transistor T10 may be formed of the oxide semiconductor, and a transistor formed of the P-type MOSFET may be formed of polysilicon.

One of the seventh sub-transistor T111 and the eighth sub-transistor T112 of the eleventh transistor T11 may be formed of the N-type MOSFET, and the other may be formed of the P-type MOSFET. In this case, a transistor formed of the N-type MOSFET among the seventh sub-transistor T111 and the eighth sub-transistor T112 of the eleventh transistor T11 may be formed of the oxide semiconductor, and a transistor formed of the P-type MOSFET may be formed of polysilicon.

Meanwhile, the second sub-pixel GP and the third sub-pixel BP according to one or more embodiments may be substantially the same as the first sub-pixel RP described in connection with FIG. 2. Therefore, descriptions of the second sub-pixel GP and the third sub-pixel BP according to one or more embodiments are omitted.

Figure 6:
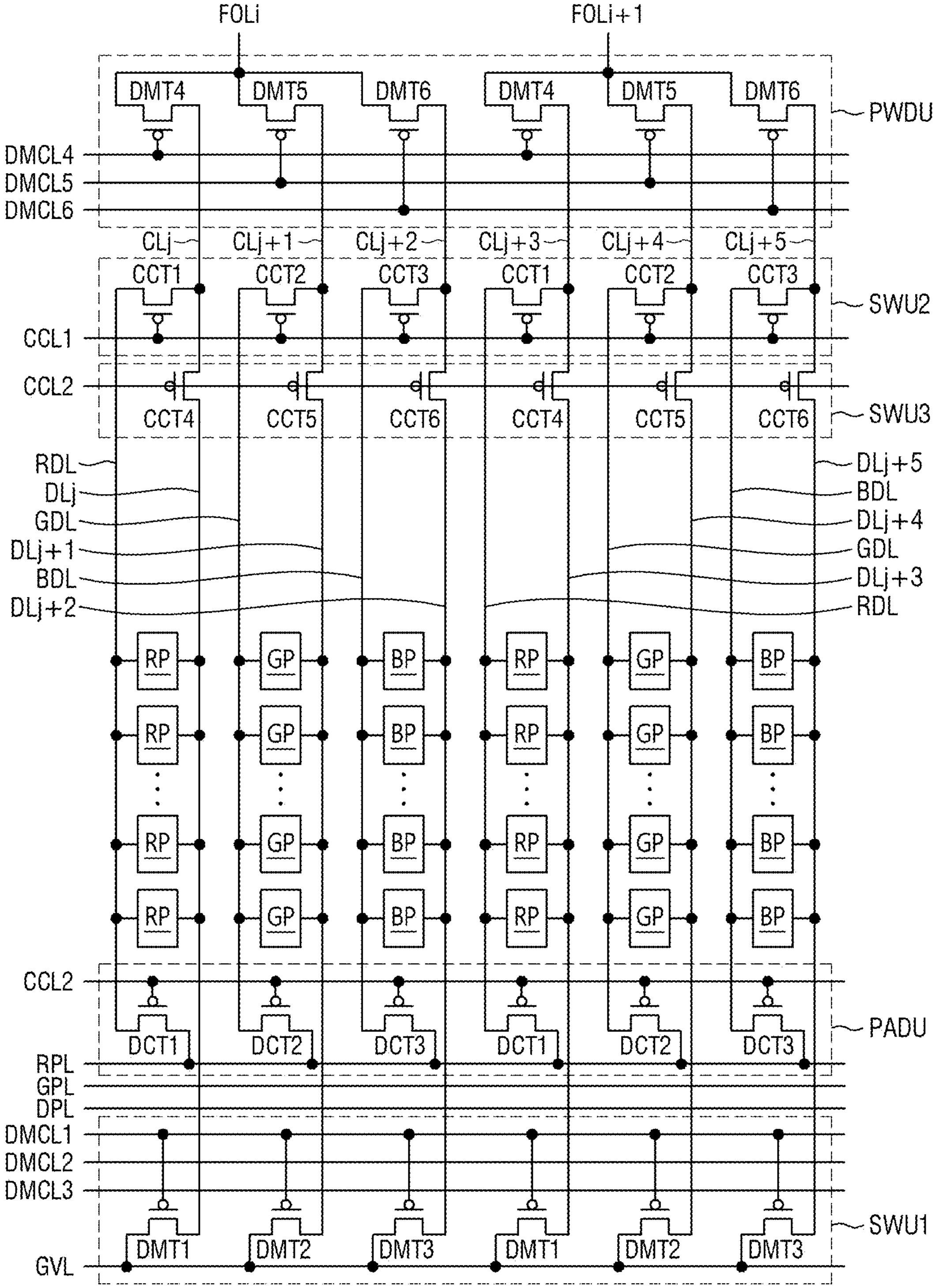
FIG. 6 is a circuit diagram illustrating a first demultiplexer, a second demultiplexer, and sub-pixels according to one or more embodiments.

FIG. 6 is a circuit diagram illustrating a first demultiplexer, a second demultiplexer, and sub-pixels according to one or more embodiments. In FIG. 6, only six PWM data lines DLj to DLj+5 and six first to third data lines RDL, GDL, and BDL are illustrated for convenience of description.

Referring to FIG. 6, the first demultiplexer DMX1 switches connections between the first to third data voltage lines RPL, GPL, and BPL connected to the second pads PD and the first to third data lines RDL, GDL, and BDL according to modes.

The mode may include a display mode, a first inspection mode, and a second inspection mode. The display mode may be a mode for displaying an image, the first inspection mode may be a mode for inspecting whether the first pixel-driving circuit PDU1 of each of the sub-pixels RP, GP, and BP is normally driven, and the second inspection mode may be a mode for inspecting whether the second pixel-driving circuit PDU2 of each of the sub-pixels RP, GP, and BP is normally driven.

The first demultiplexer DMX1 connects the first to third data voltage lines RPL, GPL, and BPL, which are connected to the second pads PD, to the first to third data lines RDL, GDL, and BDL one-to-one in the display mode and in the first inspection mode. The first demultiplexer DMX1 does not connect the first to third data voltage lines RPL, GPL, and BPL that are connected to the second pads PD2 to the first to third data lines RDL, GDL, and BDL in the second inspection mode.

The second demultiplexer DMX2 distributes the PWM data voltages applied to the fan-out lines FL, which are connected to the first pads PD1, to Q PWM data lines DL or to Q first to third data lines RDL, GDL, and BDL according to the mode. The second demultiplexer DMX2 distributes the PWM data voltages applied to each of the fan-out lines, which are connected to the first pads PD1, to Q PWM data lines DL in the display mode and in the first inspection mode. The second demultiplexer DMX2 distributes the inspection data voltages applied to each of the fan-out lines connected to the second pads PD2 to Q first to third data lines RDL, GDL, and BDL in the second inspection mode.

The first demultiplexer DMX1 includes a first data distributer PADU and a first switch SWU1.

The first data distributer PADU connects the data voltage lines RPL, GPL, and BPL to the first to third data lines RDL, GDL, and BDL, respectively, according to the first switching control signal applied to the first switching control line CCL1. That is, the first data distributer PADU may connect each of the first data voltage lines RPL to a corresponding first data line RDL, may connect each of the second data voltage lines GPL to a corresponding second data line GDL, and may connect each of the third data voltage lines BPL to a corresponding third data line BDL according to the first switching control signal applied to the first switching control line CCL1. The first data distributer PADU may include first to third data control transistors DCT1 to DCT3.

A first data control transistor DCT1 connects the first data voltage line RPL to the first data line RDL when the first switching control signal of the gate-on voltage is applied to the first switching control line CCL1. The gate electrode of the first data control transistor DCT1 may be connected to the first switching control line CCL1, the first electrode thereof may be connected to the first data voltage line RPL, and the second electrode thereof may be connected to the first data line RDL.

A second data control transistor DCT2 connects the second data voltage line GPL to the second data line GDL when the first switching control signal of the gate-on voltage is applied to the first switching control line CCL1. The gate electrode of the second data control transistor DCT2 may be connected to the first switching control line CCL1, the first electrode thereof may be connected to the second data voltage line GPL, and the second electrode thereof may be connected to the second data line GDL.

A third data control transistor DCT3 connects the third data voltage line BPL to the third data line BDL when the first switching control signal of the gate-on voltage is applied to the first switching control line CCL1. The gate electrode of the third data control transistor DCT3 may be connected to the first switching control line CCL1, the first electrode thereof may be connected to the third data voltage line BPL, and the second electrode thereof may be connected to the third data line BDL.

The first switch SWU1 applies the third power supply voltage of the global power supply line GVL to the 3j PWM data line DLj/DLj+3 according to the first PWM control signal applied to the first PWM control line DMCL1, applies the third power supply voltage of the global power supply line GVL to the 3j+1 PWM data line DLj+1/DLj+4 according to the second PWM control signal applied to the second PWM control line DMCL2, and applies the third power supply voltage of the global power supply line GVL to the 3j+2 PWM data lines DLj+2/DLj+5 according to the third PWM control signal applied to the third PWM control line DMCL3. The first switch SWU1 may include first to third demultiplexer transistors DMT1, DMT2, and DMT3.

A first demux (e.g., demultiplexer) transistor DMT1 connects the 3j PWM data line DLj/DLj+3 to the global power supply line GVL when the first PWM control signal of the gate-on voltage is applied to the first PWM control line DMCL1. The gate electrode of the first demux transistor DMT1 may be connected to the first PWM control line DMCL1, the first electrode thereof may be connected to the 3j PWM data line DLj/DLj+3, and the second electrode thereof may be connected to the global power supply line GVL.

A second demux transistor DMT2 connects the 3j+1 PWM data line DLj+1/DLj+4 to the global power supply line GVL when the second PWM control signal of the gate-on voltage is applied to the second PWM control line DMCL2. The gate electrode of the second demux transistor DMT2 may be connected to the second PWM control line DMCL2, the first electrode thereof may be connected to the 3j+1 PWM data line DLj+1/DLj+4, and the second electrode thereof may be connected to the global power supply line GVL.

A third demultiplexer DMT3 connects the 3j+2 PWM data lines DLj+2/DLj+5 to the global power supply line GVL when the third PWM control signal of the gate-on voltage is applied to the third PWM control line DMCL3. The gate electrode of the third demux transistor DMT3 may be connected to the third PWM control line DMCL3, the first electrode thereof may be connected to the 3j+2 PWM data line DLj+2/DLj+5, and the second electrode thereof may be connected to the global power supply line GVL.

As shown in FIG. 6, the first demultiplexer DMX1 may connect the data voltage lines RPL, GPL, and BPL to the first to third data lines RDL, GDL, and BDL, respectively, and may connect the PWM data lines DLj to DLj+5 to the global power supply line GVL according to the first to third distribution control signals according to the first switching control signal.

The second demultiplexer DMX2 includes a second data distributer PWDU, a second switch SWU2, and a third switch SWU3.

The second data distributer PWDU distributes voltages applied to each of the fan-out lines FOLi and FOLi+1 to Q connection lines among the connection lines CLj to CLj+5 according to the fourth to sixth distribution control signals applied to the fourth to sixth distribution control lines DMCL4 to DMCL6. That is, the second data distributer PWDU selectively connects each of the fan-out lines FOLi and FOLi+1 to Q connection lines according to the fourth to sixth distribution control signals. The second data distributer PWDU may include fourth to sixth demultiplexer transistors DMT4, DMT5, and DMT6.

A fourth demux transistor DMT4 may supply the voltage applied to the fan-out line FOLi/FOLi+1 to the 3j connection line CLj/CLj+3 when the fourth distribution control signal of the gate-on voltage is applied to the fourth distribution control line DMCL4. That is, the fourth demux transistor DMT4 may connect the fan-out line FOLi/FOLi+1 to the 3j connection line CLj/CLj+3 when the fourth distribution control signal of the gate-on voltage is applied. The gate electrode of the fourth demux transistor DMT4 may be connected to the fourth distribution control line DMCL4, the first electrode thereof may be connected to the fan-out line FOLi/FOLi+1, and the second electrode thereof may be connected to the 3j connection line CLj/CLj+3.

A fifth demultiplexer DMT5 may supply the voltage applied to the fan-out line FOLi/FOLi+1 to the 3j+1 connection line CLj+1/CLj+4 when the fifth distribution control signal of the gate-on voltage is applied to the fifth distribution control line DMCL5. That is, the fifth demux transistor DMT5 may connect the fan-out line FOLi/FOLi+1 to the 3j+1 connection line CLj+1/CLj+4 when the fifth distribution control signal of the gate-on voltage is applied. The gate electrode of the fifth demultiplexer DMT5 may be connected to the fifth distribution control line DMCL5, the first electrode thereof may be connected to the fan-out line FOLi/FOLi+1, and the second electrode thereof may be connected to the 3j+1 connection line CLj+1/CLj+4.

A sixth demux transistor DMT6 may supply the voltage applied to the fan-out line FOLi/FOLi+1 to the 3j+2 connection line CLj+2/CLj+5 when the sixth distribution control signal of the gate-on voltage is applied to the sixth distribution control line DMCL6. That is, the sixth demux transistor DMT6 may connect the fan-out line FOLi/FOLi+1 to the 3j+2 connection line CLj+2/CLj+5 when the sixth distribution control signal of the gate-on voltage is applied. The gate electrode of the sixth demux transistor DMT6 may be connected to the sixth distribution control line DMCL6, the first electrode thereof may be connected to the fan-out line FOLi/FOLi+1, and the second electrode thereof may be connected to the 3j+2 connection line CLj+2/CLj+5.

The second switch SWU2 connects the connection lines CLj to CLj+5 to the first to third data lines RDL, GDL, and BDL, respectively, according to the second switching control signal applied to the second switching control line CCL2. The second switch SWU2 may include first to third connection control transistors CCT1, CCT2, and CCT3.

A first connection control transistor CCT1 may connect the 3j connection line CLj/CLj+3 to the first data line RDL when the first switching control signal of the gate-on voltage is applied to the first switching control line CCL1. The gate electrode of the first connection control transistor CCT1 may be connected to the first switching control line CCL1, the first electrode thereof may be connected to the 3j connection line CLj/CLj+3, and the second electrode thereof may be connected to the first data line RDL.

A second connection control transistor CCT2 may connect the 3j+1 connection line CLj+1/CLj+4 to the second data line GDL when the first switching control signal of the gate-on voltage is applied to the first switching control line CCL1. The gate electrode of the second connection control transistor CCT2 may be connected to the first switching control line CCL1, the first electrode thereof may be connected to the 3j+1 connection line CLj+1/CLj+4, and the second electrode thereof may be connected to the second data line GDL.

A third connection control transistor CCT3 may connect the 3j+2 connection lines CLj+2/CLj+5 to the third data line BDL when the first switching control signal of the gate-on voltage is applied to the first switching control line CCL1. The gate electrode of the third connection control transistor CCT3 may be connected to the first switching control line CCL1, the first electrode thereof may be connected to the 3j+2 connection line CLj+2/CLj+5, and the second electrode thereof may be connected to the third data line BDL.

The third switch SWU3 connects the switching control lines CLj to CLj+5 to the PWM data lines DLj to DLj+5, respectively, according to the first switching control signal applied to the first switching control line CCL1. The third switch SWU3 may include fourth to sixth connection control transistors CCT4, CCT5, and CCT6.

A fourth connection control transistor CCT4 may connect the 3j connection line CLj/CLj+3 to the 3j PWM data line DLj/DLj+3 when the second switching control signal of the gate-on voltage is applied to the second switching control line CCL2. The gate electrode of the fourth connection control transistor CCT4 may be connected to the second switching control line CCL2, the first electrode thereof may be connected to one of the 3j connection lines CLj and CLj+3, and the second electrode thereof may be connected to the 3j PWM data line DLj/DLj+3.

A fifth connection control transistor CCT5 may connect the 3j+1 connection line CLj+1/CLj+4 to the 3j+1 PWM data line DLj+1/DLj+4 when the second switching control signal of the gate-on voltage is applied to the second switching control line CCL2. The gate electrode of the fifth connection control transistor CCT5 may be connected to the second switching control line CCL2, the first electrode thereof may be connected to the 3j+1 connection line CLj+1/CLj+4, and the second electrode thereof may be connected to the 3j+1 PWM data line DLj+1/DLj+4.

A sixth connection control transistor CCT6 may connect the 3j+2 connection line CLj+2/CLj+5 to the 3j+2 PWM data line DLj+2/DLj+5 when the second switching control signal of the gate-on voltage is applied to the second switching control line CCL2. The gate electrode of the sixth connection control transistor CCT6 may be connected to the second switching control line CCL2, the first electrode thereof may be connected to the 3j+2 connection line CLj+2/CLj+5, and the second electrode thereof may be connected to the 3j+2 PWM data lines DLj+2/DLj+5.

As shown in FIG. 6, the second demultiplexer DMX2 selectively connects each of the fan-out lines FOLi and FOLi+1 to Q first to third data lines or Q PWM data lines. That is, the second demultiplexer DMX2 may distribute the voltages applied to each of the fan-out lines FOLi and FOLi+1 to Q first to third data lines among the first to third data lines RDL, GDL, and BDL or Q PWM data lines among the PWM data lines DLj to DLj+5.

Figure 7:
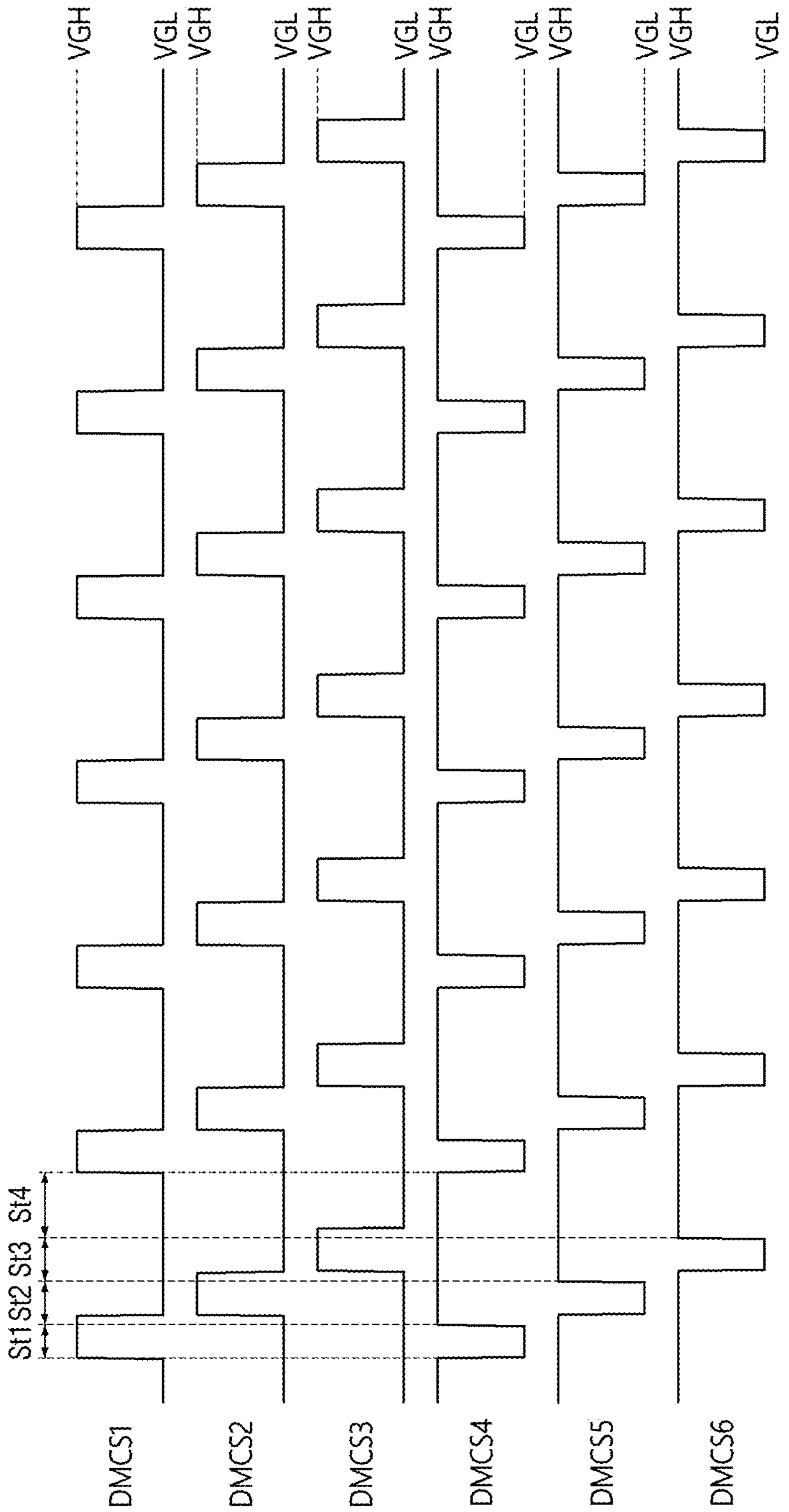
FIG. 7 is a waveform diagram illustrating first to sixth distribution control signals input to a first demultiplexer and a second demultiplexer.

FIG. 7 is a waveform diagram illustrating first to sixth distribution control signals input to a first demultiplexer and a second demultiplexer. FIG. 7 illustrates waveform diagrams of first to sixth distribution control signals DMCS1 to DMCS6 input to the first and second demultiplexers in the display mode, the first inspection mode, and the second inspection mode.

Each of the first to sixth distribution control signals DMCS1 to DMCS6 may be a signal repeated at a cycle (e.g., predetermined cycle). One cycle may include the first to fourth sub-periods st1 to st4.

The first distribution control signal DMCS1 may be generated as the gate-off voltage VGH during the first sub-period st1 and as the gate-on voltage VGL during the second to fourth periods st2 to st4. The second distribution control signal DMCS2 may be generated as the gate-off voltage VGH during the second sub-period st2 and as the gate-on voltage VGL during the first, third, and fourth periods st1, st3, and st4. The third distribution control signal DMCS3 may be generated as the gate-off voltage VGH during the third sub-period st3 and as the gate-on voltage VGL during the first, second, and fourth periods st1, st2, and st4.

The fourth distribution control signal DMCS4 may be generated as the gate-on voltage VGL during the first sub-period st1 and as the gate-off voltage VGH during the second to fourth sub-periods st2 to st4. The fifth distribution control signal DMCS5 may be generated as the gate-on voltage VGL during the second sub-period st2 and as the gate-off voltage VGH during the first, third, and fourth sub-periods st1, st2, and st4. The sixth distribution control signal DMCS6 may be generated as the gate-on voltage VGL during the third sub-period st3 and as the gate-off voltage VGH during the first, second, and fourth sub-periods st1, st2, and st4.

In one or more embodiments, the first switching control signal of the first switching control line CCL1 may be generated as the gate-on voltage VGL in the display mode and the first inspection mode, and may occur as the gate-off voltage VGH in the second inspection mode. In comparison, the second switching control signal of the second switching control line CCL2 may be generated as the gate-off voltage VGH in the display mode, and may occur as the gate-on voltage VGL in the second inspection mode.

Hereinafter, an operation method of the first demultiplexer DMX1 and the second demultiplexer DMX2 according to one or more embodiments will be described with reference to FIGS. 6 and 7.

First, the first demultiplexer DMX1 may connect the first to third data voltage lines RPL, GPL, and BPL to which the first to third data voltages are applied to the first to third data lines RDL, GDL, and BDL, respectively in the display mode and the first inspection mode. Also, the second demultiplexer DMX1 may time-divide and supply the PWM data voltages applied to the fan-out lines FOLi and FOLi+1 to the Q PWM data lines in the display mode and the first inspection mode.

For example, the first switching control signal of the gate-on voltage VGL is applied to the first switching control line CCL1, and the second switching control signal of the gate-off voltage VGH is applied to the second switching control line CCL2 in the display mode and the first inspection mode. The first to third data control transistors DCT1 to DCT3 of the first demultiplexer DMX1 may be turned on, and the first to third connection control transistors CCT1 to CCT3 of the second demultiplexer DMX2 may be turned on by the first switching control signal of the gate-on voltage VGL in the display mode and the first inspection mode. The fourth to sixth connection control transistors CCT4 to CCT6 of the second demultiplexer DMX2 may be turned off by the second switching control signal of the gate-off voltage VGH in the display mode and the first inspection mode.

The data voltage lines RPL, GPL, and BPL to which the first to third data voltages are applied may be connected to the first to third data lines RDL, GDL, and BDL, respectively, by turning-on the first to third data control transistors DCT1 to DCT3 of the first demultiplexer DMX1 in the display mode and the first inspection mode. That is, each of the first data voltage lines RPL may be connected to the corresponding first data line RDL, each of the second data voltage lines GPL may be connected to the corresponding second data line GDL, and each of the third data pad lines BPL may be connected to the corresponding third data line BDL in the display mode and the first inspection mode. In this case, the first data voltage may be applied to each of the first data lines RDL, the second data voltage may be applied to each of the second data lines GDL, and the third data voltage may be applied to each of the third data lines BDL.

The connection lines CLj to CLj+5 may be connected one-to-one to the PWM data lines DLj to DLj+5 by turning-on the fourth to sixth connection control transistors CCT4 to CCT6 in the display mode and the first inspection mode. That is, the $j^{th}$ connection line CLj may be connected to the $j^{th}$ PWM data line DLj, the $j+1^{th}$ connection line CLj+1 may be connected to the j+1 PWM data line DLj+1, the $j+2^{th}$ connection line CLj+2 may be connected to the $j+2^{th}$ PWM data line DLj+2, the $j+3^{th}$ connection line CLj+3 may be connected to the $j+3^{th}$ PWM data line DLj+3, the $j+4^{th}$ connection line CLj+4 may be connected to the $j+4^{th}$ PWM data line DLj+4, and the $j+5^{th}$ connection line CLj+5 may be connected to the $j+5^{th}$ PWM data line DLj+5 in the display mode and the first inspection mode.

The second to fourth distribution control signals DMCS2 to DMCS4 generate the gate-on voltage VGL, and the first, fifth, and sixth distribution control signals DMCS1, DMCS5, and DMCS6 generate the gate-off voltage VGH during the first sub period st1 in the display mode and the first inspection mode. The PWM data voltage of the $i^{th}$ fan-out line FOLi may be applied to the $j^{th}$ PWM data line DLj, and the PWM data voltage of the $i+1^{th}$ fan-out line FOLi+1 may be applied to the $j+3^{th}$ PWM data line DLj+3 due to the on state of the fourth demultiplexer transistor DMT4 during the first sub-period st1 in the display mode and the first inspection mode. Also, the global power supply voltage GV of the global power supply line GVL may be applied to the j+1, j+2, j+4, and j+5 PWM data lines DLj+1, DLj+2, DLj+4, and DLj+5 due to the on state of the second and third demultiplexer transistors DMT2 and DMT3 during the first sub period st1 in the display mode and the first inspection mode.

The first, third, and fifth distribution control signals DMCS1, DMCS3, and DMCS5 are generated as gate-on voltages VGL during the second sub period st2 in the display mode and the first inspection mode, and the second, fourth, and sixth distribution control signals DMCS2, DMCS4, and DMCS6 are generated as gate-off voltages VGH. The PWM data voltage of the $i^{th}$ fan-out line FOLi is applied to the $j+1^{th}$ PWM data line DLj+1 due to the on state of the fifth demultiplexer transistor DMT5 during the second sub period st2, and the PWM data voltage of the $i+1^{th}$ fan-out line FOLi+1 may be applied to the $j+4^{th}$ PWM data line DLj+4. Also, the global power supply voltage GV of the global power supply line GVL may be applied to the $j^{th}$, j+2, j+3, and j+5 PWM data lines DLj, DLj+2, DLj+3, and DLj+5 due to the on state of the first and third demultiplexer transistors DMT1 and DMT3 during the second sub period st2 in the display mode and the first inspection mode.

The first, second, and sixth distribution control signals DMCS1, DMCS2, and DMCS6 are generated as gate-on voltages VGL during the third sub period st3 in the display mode and the first inspection mode, and the third to fifth distribution control signals DMCS3, DMCS4, and DMCS5 are generated as gate-off voltages VGH. The PWM data voltage of the $i^{th}$ fan-out line FOLi may be applied to the $j+2^{th}$ PWM data line DLj+2, and the PWM data voltage of the $i+1^{th}$ fan-out line FOLi+1 may be applied to the $j+5^{th}$ PWM data line DLj+5 due to the on state of the sixth demultiplexer transistor DMT6 during the third sub-period st3. Also, the global power supply voltage GV of the global power supply line GVL may be applied to the $j^{th}$, j+1, j+3, and $j+4^{th}$ PWM data lines DLj, DLj+1, DLj+3, and DLj+4 due to the on state of the first and second demultiplexer transistors DMT1 and DMT2 during the third sub-period st3 in the display mode and the first inspection mode.

The first to third distribution control signals DMCS1, DMCS2, and DMCS3 are generated as gate-on voltages VGL, and the fourth to sixth distribution control signals DMCS4, DMCS5, and DMCS6 are generated as gate-off voltages VGH during the fourth sub period st4 in the display mode and the first inspection mode. Also, the global power supply voltage GV of the global power supply line GVL may be applied to the $j^{th}$ to j+5 PWM data lines DLj, DLj+1, DLj+2, DLj+3, DLj+4, and DLj+5 due to the on state of the first to third demultiplexer transistors DMT1, DMT2, and DMT3 during the fourth sub-period st4.

As described above, the PWM data voltages of the fan-out lines FOLi and FOLi+1 may distribute to the PWM data lines DLj to DLj+5, and the first to third data voltages of the data voltage lines RPL, GPL, and BPL may be applied to the first to third data lines RDL, GDL, and BDL, respectively, in the display mode and the first inspection mode. Therefore, the light-emitting elements EL of the sub-pixels RP, GP, and BP may emit light according to the PWM data voltages applied to the PWM data lines DLj to DLj+5, and according to the PAM data voltages applied to the first to third data lines RDL, GDL, and BDL, in the display mode and the first inspection mode. Therefore, the sub-pixels RP, GP, and BP may display images or may be checked whether the first pixel-driving circuit PDU1 of each of the sub-pixels RP, GP, and BP is normally driven in the display mode.

Second, the first demultiplexer DMX1 does not connect the data voltage lines RPL, GPL, and BPL to which the first to third data voltages are applied to the first to third data lines RDL, GDL, and BDL, respectively, and the second demultiplexer DMX1 may time-divide and supply the inspection data voltages applied to the fan-out lines FOLi and FOLi+1 to Q first to third data lines in the second inspection mode.

For example, the first switching control signal of the gate-off voltage VGH is applied to the first switching control line CCL1, and the second switching control signal of the gate-on voltage VGL is applied to the second switching control line CCL2, in the second inspection mode. The fourth to sixth connection control transistors CCT4 to CCT6 may be turned on by the second switching control signal of the gate-on voltage VGL in the second inspection mode. The first to third data control transistors DCT1 to DCT3 and the first to third connection control transistors CCT1 to CCT3 may be turned off by the first switching control signal of the gate-off voltage VGH in the second inspection mode.

The connection lines CLj to CLj+5 may be connected to the first to third data lines RDL, GDL, and BDL one-to-one due to the on state of the first to third connection control transistors CCT1 to CCT3 in the second inspection mode. That is, the $j^{th}$ connection line CLj may be connected to the first data line RDL, the $j+1^{th}$ connection line CLj+1 may be connected to the second data line GDL, the $j+2^{th}$ connection line CLj+2 may be connected to the third data line BDL, the $j+3^{th}$ connection line CLj+3 may be connected to the first data line RDL, the j+4$^{th}$ connection line CLj+4 may be connected to the second data line GDL, and the j+5$^{th}$ connection line CLj+5 may be connected to the third data line BDL in the second inspection mode.

The first to third data voltage lines RPL, GPL, and BPL may not be connected to the first to third data lines RDL, GDL, and BDL, respectively, due to the off state of the first to third data control transistors DCT1 to DCT3 in the second inspection mode. In addition, the connection lines CLj to CLj+5 may not be connected to the PWM data lines DLj to DLj+5 due to the off state of the fourth to sixth connection control transistors CCT4 to CCT6 in the second inspection mode.

The first to third demultiplexer transistors DMT1 to DMT3 are turned off while operations of the fourth to sixth demultiplexer transistors DMT4 to DMT6 are substantially the same as those in the display mode, and those in the first inspection mode, in the second inspection mode.

In summary, the inspection data voltages of the fan-out lines FOLi and FOLi+1 may be applied to the first data lines RDL, respectively, during the first sub-period st1, the inspection data voltages of the fan-out lines FOLi and FOLi+1 may be respectively applied to the second data lines GDL during the second sub-period st2, and the inspection data voltages of the fan-out lines FOLi and FOLi+1 may be applied to the third data lines BDL, respectively during the third sub-period st3 in the second inspection mode. Therefore, because the light-emitting elements LE of the sub-pixels RP, GP, and BP may emit light according to the inspection data voltages of the first to third data lines RDL, GDL, and BDL, it is possible to check whether the second pixel-driving circuit PDU2 is normally driven in the second mode.

Figure 8:
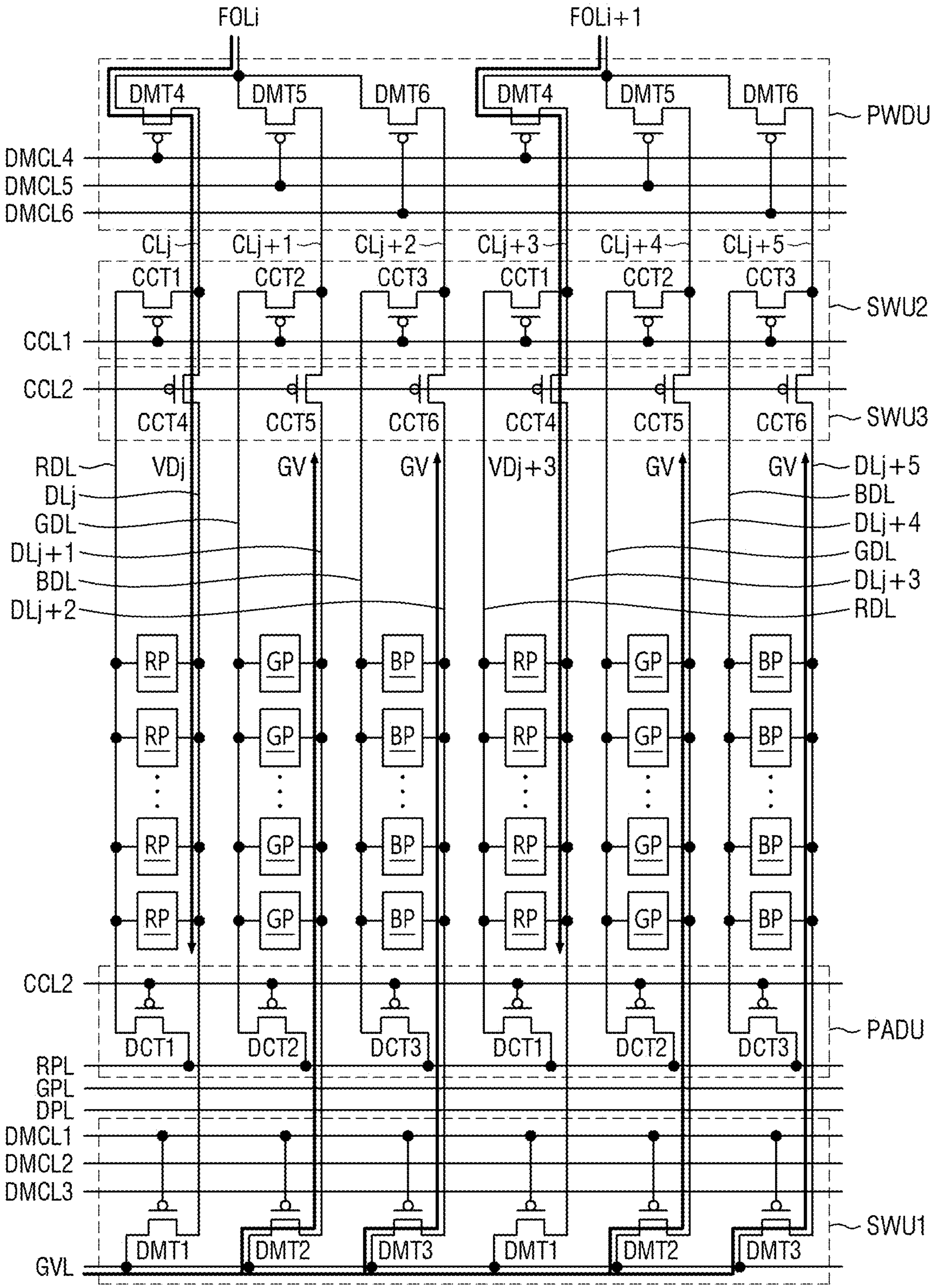
FIGS. 8 to 11 are diagrams illustrating potential changes of the $j^{th}$ to $j+5^{th}$ data lines during the first to fourth sub-periods.
Figure 9:
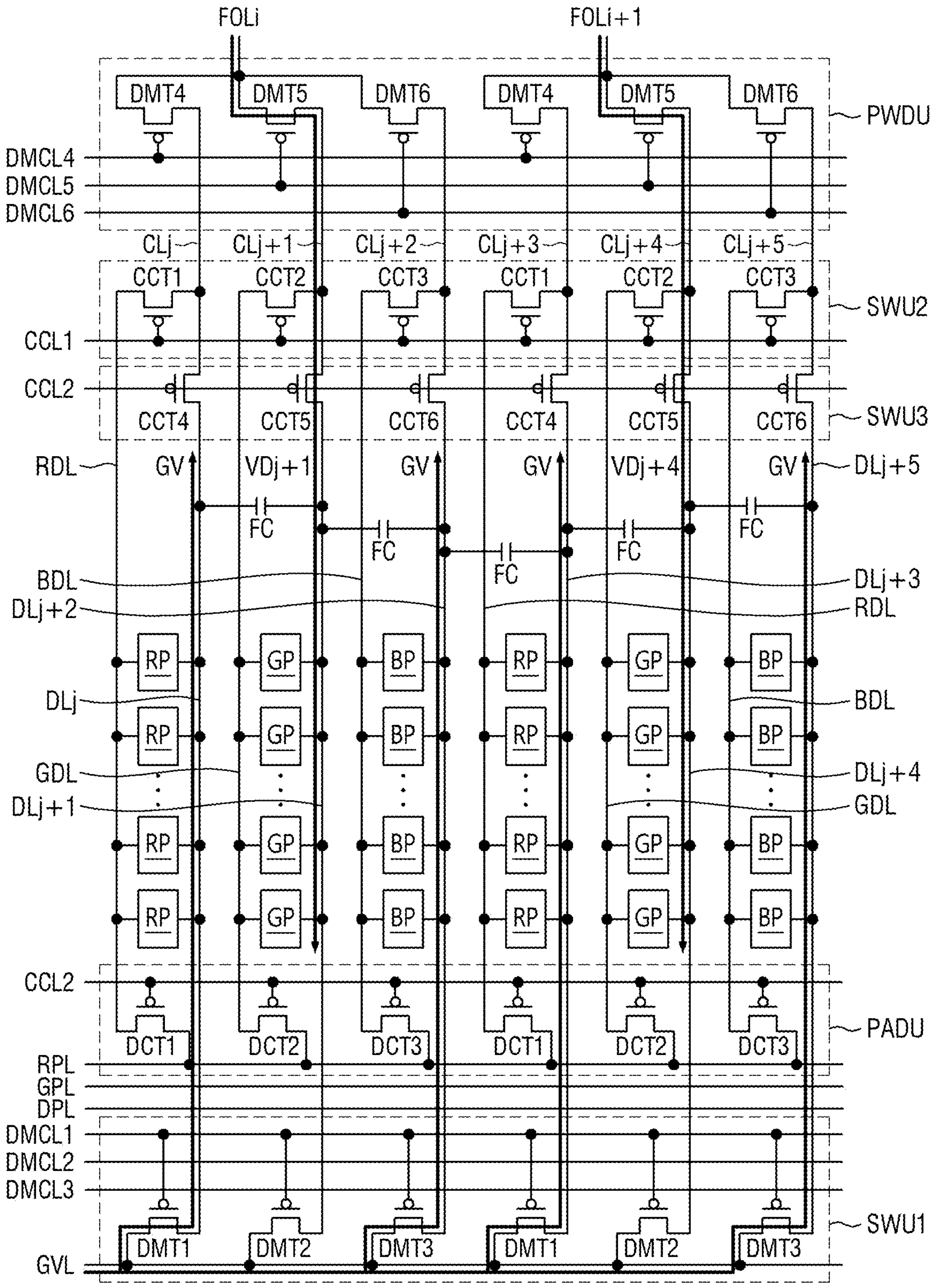
Figure 10:
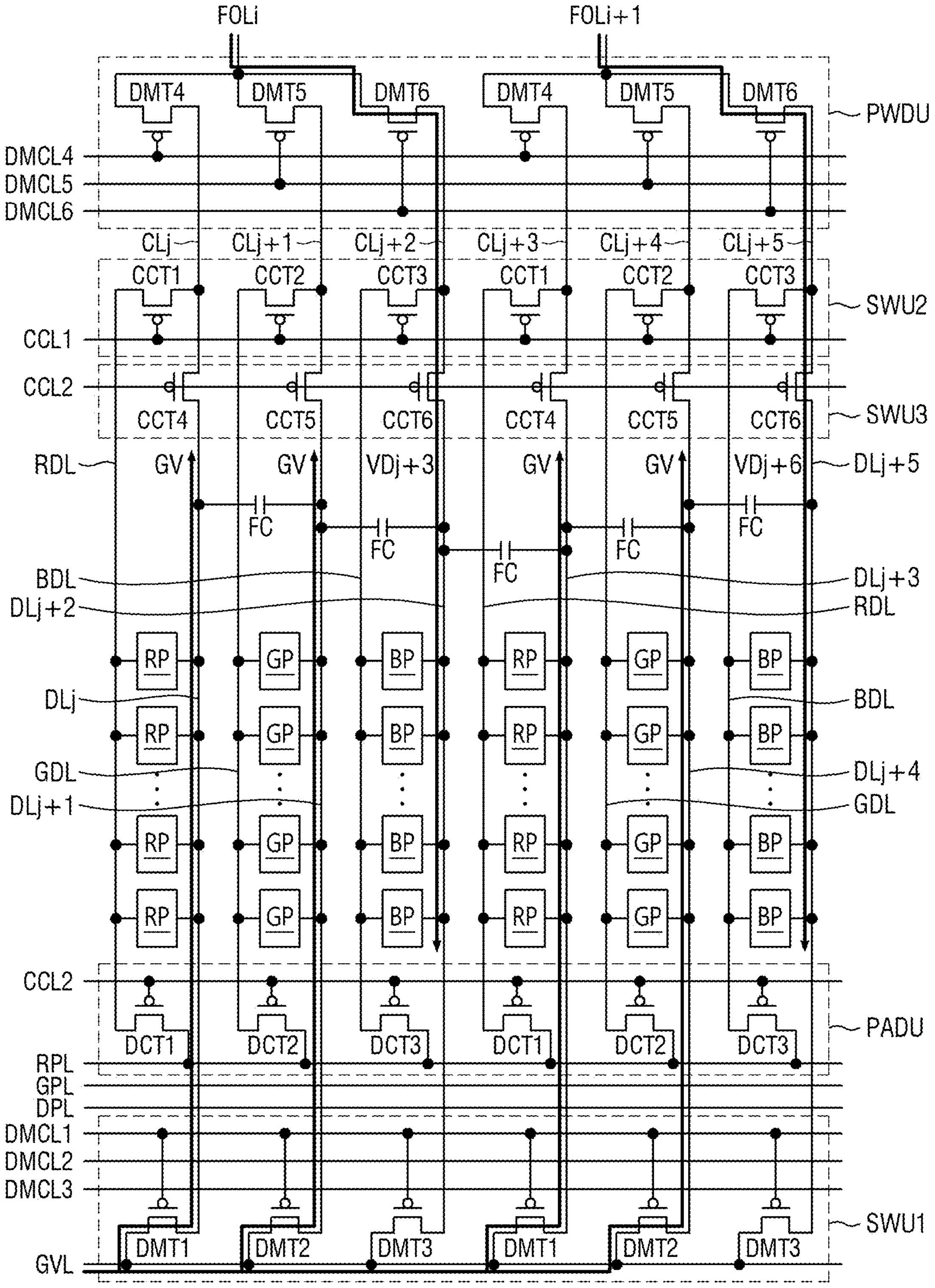
Figure 11:
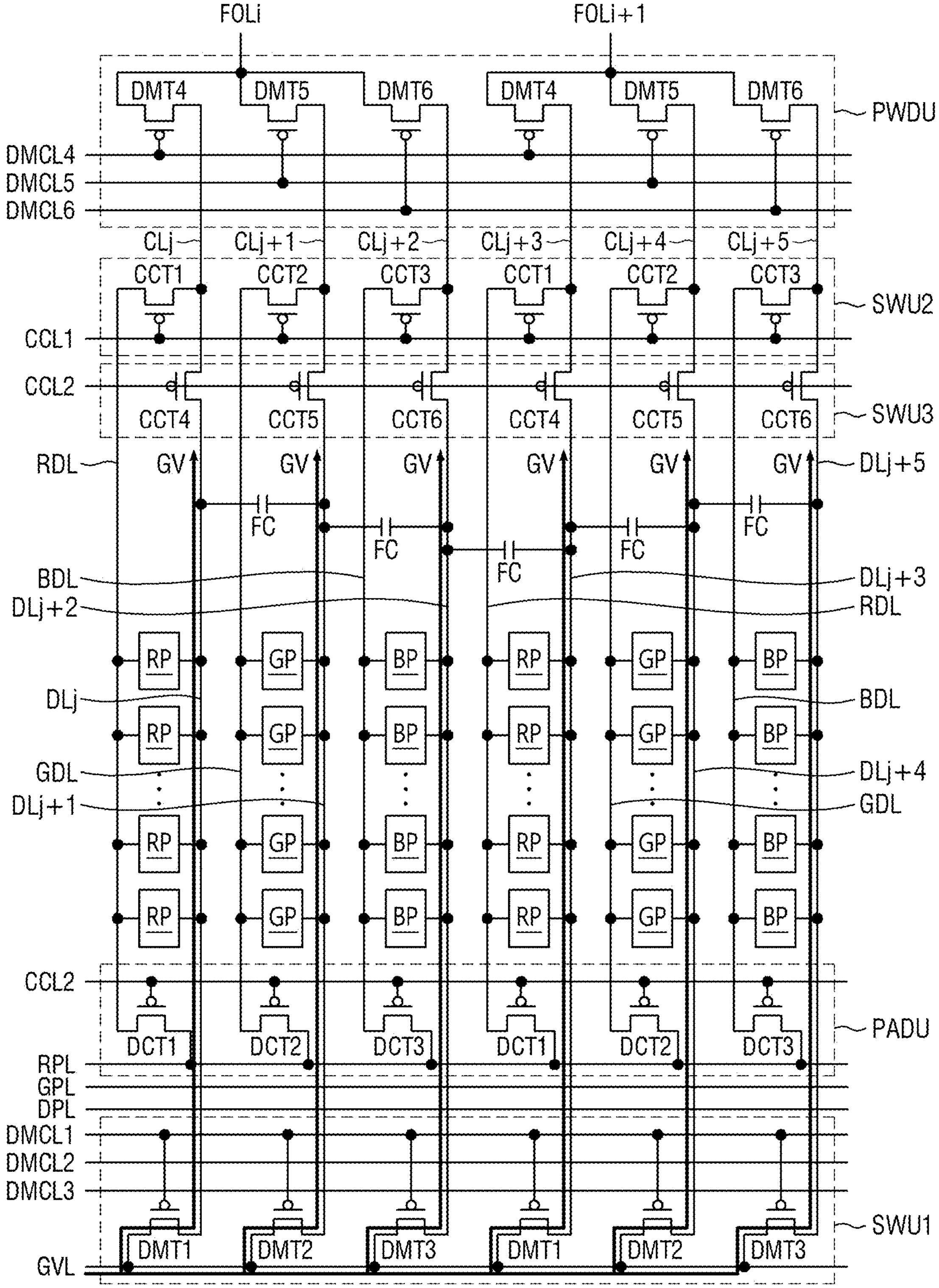
Figure 12:
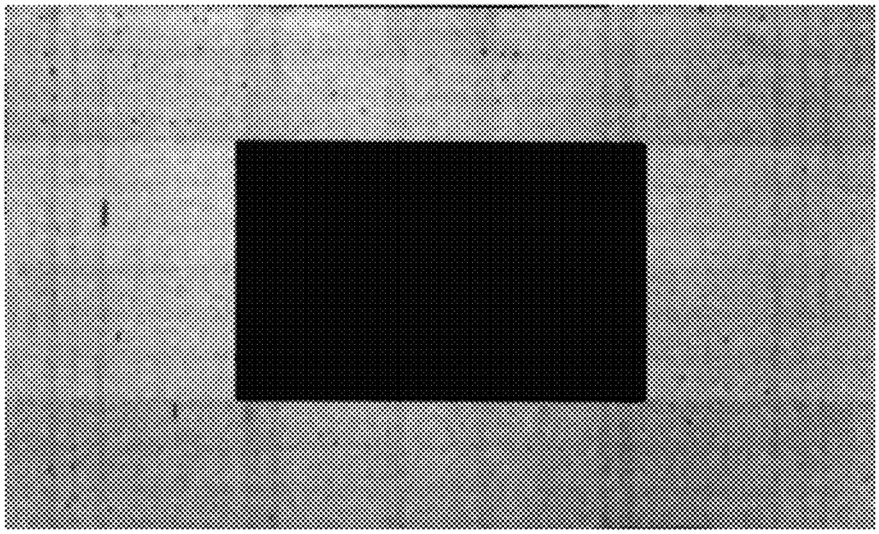
FIG. 12 is a view illustrating a display image in which crosstalk has occurred.

FIGS. 8 to 11 are diagrams illustrating potential changes of the j$^{th}$ to j+5$^{th}$ data lines during the first to fourth sub-periods. FIG. 12 is a view illustrating a display image in which crosstalk has occurred. FIG. 8 shows voltages applied to the j$^{th}$ to j+5$^{th}$ data lines during the first sub period st1 and FIG. 9 shows voltages applied to the j$^{th}$ to j+5$^{th}$ data lines during the second sub period st2. FIG. 10 shows voltages applied to the j$^{th}$ to j+5$^{th}$ data lines during the third sub period st3 and FIG. 11 shows voltages applied to the j$^{th}$ to j+5$^{th}$ data lines during the fourth sub period st4. The voltage applied to is shown.

Referring to FIG. 8, the PWM data voltage of the i$^{th}$ fan-out line FOLi may be applied to the j$^{th}$ PWM data line DLj, the PWM data voltage of the i+1$^{th}$ fan-out line FOLi+1 may be applied to the j+3$^{th}$ PWM data line DLj+3, the global power supply voltage GV may be applied to the j+1$^{th}$, j+2$^{th}$, j+4$^{th}$, and j+5$^{th}$ PWM data lines DLj+1, DLj+2, DLj+4, and DLj+5 during the first sub period st1 of the display mode. That is, defective image quality may be reduced, or may be prevented from being affected, due to a change in the surrounding potential of the j+1$^{th}$, j+2$^{th}$, j+4$^{th}$, and j+5$^{th}$ PWM data lines DLj+1, DLj+2, DLj+4, and DLj+5, by applying the global power supply voltage GV to the j+1$^{th}$, j+2$^{th}$, j+4$^{th}$, and j+5$^{th}$ PWM data lines DLj+1, DLj+2, DLj+4, and DLj+5 to which no PWM data voltage is applied during the first sub period st1.

The PWM data voltage may have a black grayscale voltage or a white grayscale voltage. The PWM data voltage may include a black grayscale voltage, a white grayscale voltage, and a gray grayscale voltage that is between the black grayscale voltage and the white grayscale voltage. For example, when the black grayscale voltage is approximately 9V and the white grayscale voltage is 15V, the PWM data voltage may be 9V to 15V. When the black grayscale voltage is applied to the sub-pixel RP/GP/BP, the light-emitting element EL of the sub-pixel RP/GP/BP indicates a voltage expressing the black grayscale. When the white grayscale voltage is applied to the sub-pixel RP/GP/BP, the light-emitting element EL of the sub-pixel RP/GP/BP indicates the voltage expressing the white grayscale. When the gray grayscale voltage is applied to the sub-pixel RP/GP/BP, the light-emitting element EL of the sub-pixel RP/GP/BP indicates a voltage expressing the gray grayscale.

The global power supply voltage GV may be a voltage that is substantially equal to or less than the black grayscale voltage. For example, when the global power supply voltage GV is higher than the black grayscale voltage, the black grayscale voltage is input from the source-driving circuit 300 to the corresponding PWM data line. Also, because the data voltage is not charged through the corresponding PWM data line, the data voltage must be discharged from the corresponding PWM data line to the source-driving circuit 300. That is, the source-driving circuit 300 may be damaged as current flows from the PWM data line to the source-driving circuit 300.

In addition, as the voltage difference between the black grayscale voltage and the global power supply voltage GV increases, the amount of voltage variation of the corresponding PWM data line may affect the PWM data line adjacent thereto. Accordingly, the global power supply voltage GV may have a potential that is close to the black grayscale voltage. For example, the global power supply voltage GV may be about 8V to about 9V.

In addition, because the global power supply voltage GV has the potential close to the black grayscale voltage, the voltage difference between the black grayscale voltage and the global power supply voltage GV may be less than a voltage difference between the third power supply voltage VSS and the global power supply voltage GV. Also, the voltage difference between the black grayscale voltage and the global power supply voltage GV may be less than the voltage difference between the first power supply voltage VDD1 and the global power supply voltage GV. Also, the voltage difference between the black grayscale voltage and the global power supply voltage GV may be less than the voltage difference between the second power supply voltage VDD2 and the global power supply voltage GV. Also, the voltage difference between the black grayscale voltage and the global power supply voltage GV may be less than the voltage difference between the initialization voltage VINT and the global power supply voltage GV. Also, the voltage difference between the black grayscale voltage and the global power supply voltage GV may be less than the voltage difference between the gate-on voltage VGL and the global power supply voltage GV. Also, the voltage difference between the black grayscale voltage and the global power supply voltage GV may be less than the voltage difference between the gate off voltage VGH and the global power supply voltage GV.

For example, as shown in FIG. 8, the PWM data voltage VDj of the i$^{th}$ fan-out line FOLi may be applied to the j$^{th}$ PWM data line DLj, the PWM data voltage VDj+3 of the i+1$^{th}$ fan-out line FOLi+1 may be applied to the j+3$^{th}$ PWM data line DLj+3, and the global power supply voltage GV, for example, 8V may be applied to the j+1$^{th}$, j+2$^{th}$, j+4$^{th}$, and j+5$^{th}$ PWM data lines DLj+1, DLj+2, DLj+4, and DLj+5 during the first sub-period st1 of the display mode.

In addition, as shown in FIG. 9, the PWM data voltage VDj+1 of the i$^{th}$ fan-out line FOLi may be applied to the j+1$^{th}$ PWM data line DLj, the PWM data voltage VDj+4 of the i+1$^{th}$ fan-out line FOLi+1 may be applied to the j+4$^{th}$ PWM data line DLj+4, and the global power supply voltage GV, for example, 8V may be applied to the $j^{th}$, $j+2^{th}$, $j+3^{th}$, and $j+5^{th}$ PWM data lines DLj, DLj+2, DLj+3, and DLj+5 during the second sub-period st2 of the display mode.

In this case, the potential of the $j^{th}$ data line DLj changes from the PWM data voltage VDj to the global power supply voltage GV and the potential of the $j+3^{th}$ data line DLj+3 may change from the PWM data voltage VDj+3 to the global power supply voltage GV. The amount of change in the voltage of the $j^{th}$ data line DLj may affect the voltage of the adjacent $j+1^{th}$ data line DLj+1 by the fringe capacitance FC. Also, the amount of change in the voltage of the $j+3^{th}$ data line DLj+3 may affect the voltage of the $j+2^{th}$ data line DLj+2 and the voltage of the $j+4^{th}$ data line DLj+4 adjacent by the fringe capacitance FC. However, because the voltage difference between the PWM data voltages VDj and VDj+3 and the global power supply voltage GV is reduced or minimized, the influence of the voltage of the PWM data line adjacent thereto by the change in the $j^{th}$ data line DLj and the voltage of the and $j+3^{th}$ data lines DLj+3 may be reduced or minimized.

In addition, as shown in FIG. 10, 9V to 15V, which is the PWM data voltage VDj+2 of the $i^{th}$ fan-out line FOLi, may be applied to the $j+2^{th}$ PWM data line DLj+2, 9V to 15V, which is the PWM data voltage VDj+5 of the $i+1^{th}$ fan-out line FOLi+1, may be applied to the $j+5^{th}$ PWM data line DLj+5, and 8V, which is the global power supply voltage GV, may be applied to the $j^{th}$, j+1, j+3, and $j+4^{th}$ PWM data lines DLj, DLj+1, DLj+3, and DLj+4 during the third sub period st3 of the display mode.

In this case, the potential of the $j+1^{th}$ data line DLj+1 may change from the PWM data voltage VDj+1 to the global power supply voltage GV and the potential of the $j+4^{th}$ data line DLj+4 may change from the PWM data voltage VDj+4 to the global power supply voltage GV. The voltage variation of the $j+1^{th}$ data line DLj+1 may affect the voltage of the $j^{th}$ data line DLj and the voltage of the $j+2^{th}$ data line DLj+2 adjacent by the fringe capacitance. Also, the amount of change in the voltage of the $j+4^{th}$ data line DLj+4 may affect the voltage of the $j+3^{th}$ data line DLj+3 and the voltage of the $j+5^{th}$ data line DLj+5 adjacent by the fringe capacitance. However, because the voltage difference between the PWM data voltages VDj+1 and VDj+4 and the global power supply voltage GV is reduced or minimized, the change in the voltage of the PWM data line adjacent to the PWM data line due to the change in the voltage of the PWM data line may be reduced or minimized.

In addition, as shown in FIG. 11, the global power supply voltage GV, for example, 8V, may be applied to the $j^{th}$ to $j+5^{th}$ PWM data lines DLj to DLj+5 during the fourth sub-period st4 of the display mode.

In this case, the potential of the $j+2^{th}$ data line DLj+2 may change from the PWM data voltage VDj+2 to the global power supply voltage GV and the potential of the $j+5^{th}$ data line DLj+5 may change from the PWM data voltage VDj+5 to the global power supply voltage GV. The voltage variation of the $j+2^{th}$ data line DLj+2 may affect the voltage of the $j+1^{th}$ data line DLj+1 and the voltage of the $j+3^{th}$ data line DLj+3 adjacent by the fringe capacitance. Also, the amount of change in the voltage of the $j+5^{th}$ data line DLj+5 may affect the voltage of the $j+4^{th}$ data line DLj+4 adjacent by the fringe capacitance.

In summary, it is possible to reduced or minimize the effect of the voltage change amount of one PWM data line on the voltage of the PWM data line adjacent thereto by the fringe capacitance by reducing or minimizing the voltage difference between the black grayscale voltage and the global power supply voltage GV. As a result, the likelihood of the potential of the gate electrode of the first transistor T1 being varied as the potential of the PWM data line is varied by the fringe capacitance may be reduced or prevented. Therefore, when the black pattern is displayed in the center of a gray background as shown in FIG. 12, crosstalk in which a gray color brighter than the top and bottom of the black pattern is visually recognized may be reduced or prevented from occurring at the left and right peripheries of the black pattern.

Figure 13:
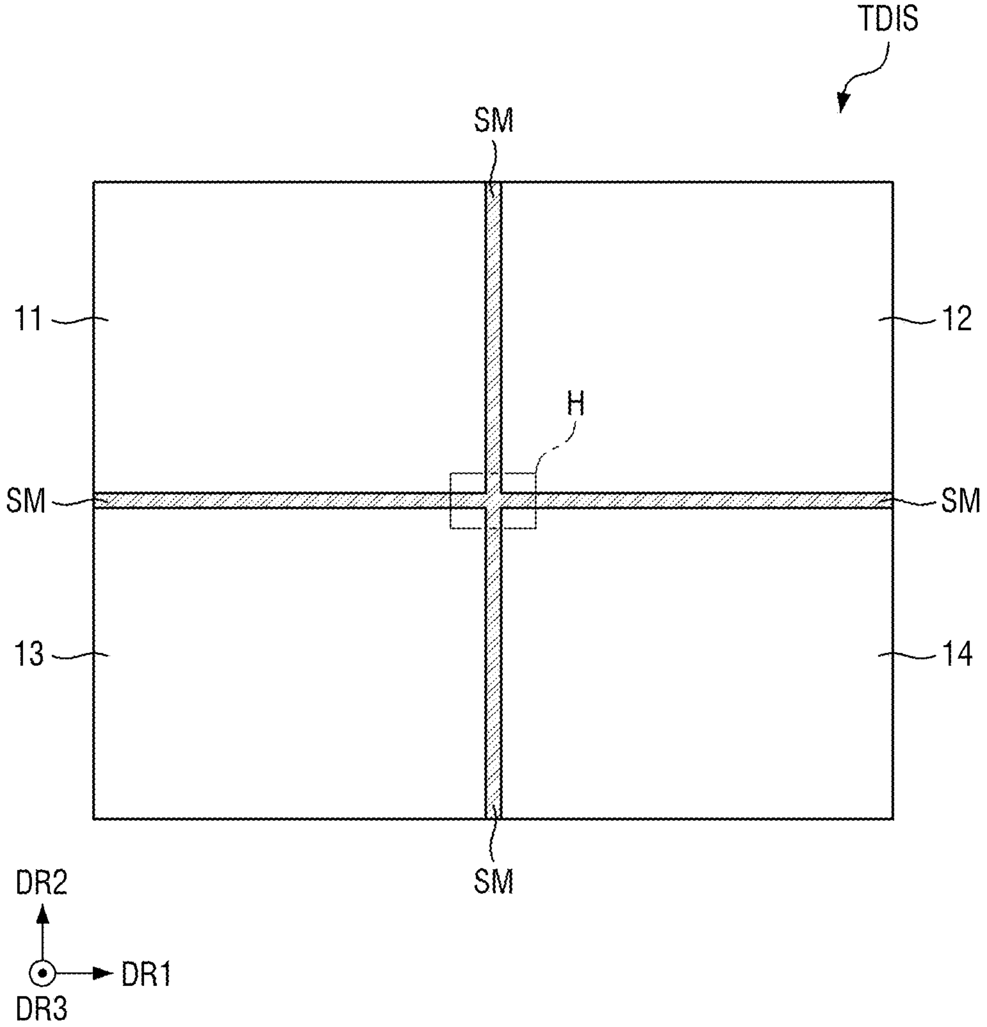
FIG. 13 is a perspective view illustrating a tiled display device including a plurality of display devices according to one or more embodiments.

FIG. 13 is a perspective view illustrating a tiled display device including a plurality of display devices according to one or more embodiments.

Referring to FIG. 13, a tiled display device TDIS may include a plurality of display devices 11, 12, 13, and 14, and a connection member SM. For example, the tiled display device TD may include a first display device 11, a second display device 12, a third display device 13, and a fourth display device 14.

The plurality of display devices 11, 12, 13, and 14 may be arranged in a matrix form in M (M is a positive integer) number of rows and N (N is a positive integer) number of columns. For example, the first display device 11 and the second display device 12 may be adjacent to each other in the first direction DR1. The first display device 11 and the third display device 13 may be adjacent to each other in the second direction DR2. The third display device 13 and the fourth display device 14 may be adjacent to each other in the first direction DR1. The second display device 12 and the fourth display device 14 may be adjacent to each other in the second direction DR2.

However, the number and arrangement of the plurality of display devices 11, 12, 13, and 14 in the tiled display device TDIS are not limited to those illustrated in FIG. 13. The number and arrangement of the display devices 11, 12, 13, and 14 in the tiled display device TDIS may be determined in response to the size of the display device 10 and the tiled display device TDIS, and the shape of the tiled display device TDIS.

The plurality of display devices 11, 12, 13, and 14 may have the same size as each other, but the present disclosure is not limited thereto. For example, the plurality of display devices 11, 12, 13, and 14 may have different sizes.

Each of the plurality of display devices 11, 12, 13, and 14 may have a rectangular shape including long sides and short sides. The plurality of display devices 11, 12, 13, and 14 may be located such that the long sides or the short sides thereof are respectively connected to each other. Some or all of the plurality of display devices 11, 12, 13, and 14 may be located at the edge of the tiled display device TDIS and may be located one side of the tiled display device TDIS. At least one of the plurality of display devices 11, 12, 13, and 14 may be located at least one corner of the tiled display device TDIS and may be formed two adjacent sides of the tiled display device TDIS. At least one of the plurality of display devices 11, 12, 13, and 14 may be surrounded by other display devices.

Each of the plurality of display devices 11, 12, 13, and 14 may be substantially the same as the display device 10 described with reference to FIGS. 1A and 1B. Therefore, a description of each of the plurality of display devices 11, 12, 13, and 14 will be omitted.

The connection member SM may include a coupling member or an adhesive member. In this case, the plurality of display devices 11, 12, 13, and 14 may be connected to each other by the coupling member or the adhesive member of the connection member SM. The connection member SM may be located between the first display device 11 and the second display device 12, between the first display device 11 and the third display device 13, between the second display device 12 and the fourth display device 14, and between the third display device 13 and the fourth display device 14.

Figure 14:
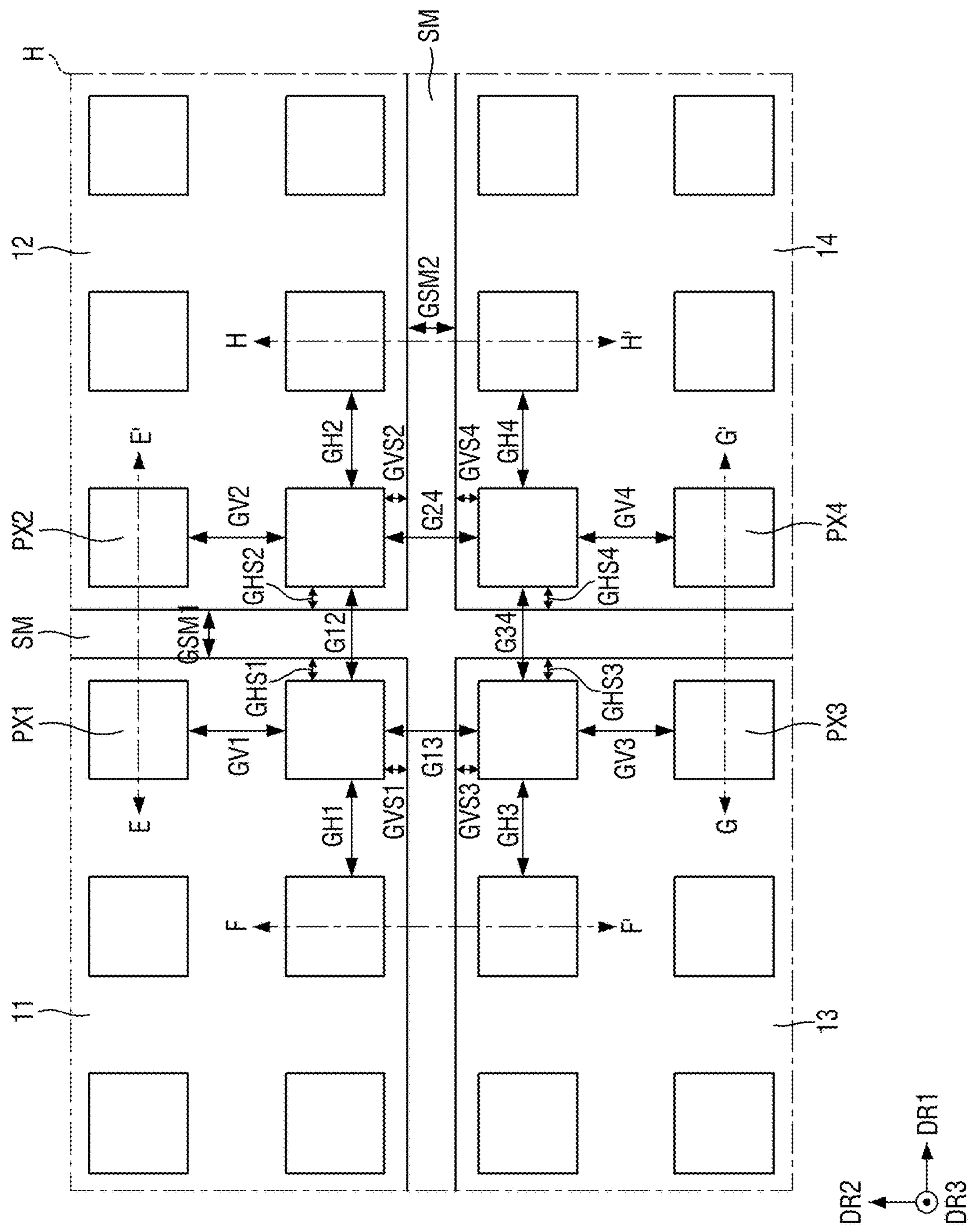
FIG. 14 is an enlarged layout diagram illustrating area H of FIG. 13.

FIG. 14 is an enlarged layout diagram illustrating area H of FIG. 13.

Referring to FIG. 14, the connection member SM may have a planar shape of a cross, or a plus sign in a central area of the device TDIS in which the first display device 11, the second display device 12, the third display device 13, and the fourth display device 14 are adjacent to each other. The connection member SM may be located between the first display device 11 and the second display device 12, between the first display device 11 and the third display device 13, between the second display device 12 and the fourth display device 14, and between the third display device 13 and the fourth display device 14.

The first display device 11 may include first pixels PX1 arranged in a matrix form in the first direction DR1 and the second direction DR2 to display an image. The second display device 12 may include second pixels PX2 arranged in a matrix in the first direction DR1 and the second direction DR2 to display an image. The third display device 13 may include third pixels PX3 arranged in a matrix in the first direction DR1 and the second direction DR2 to display an image. The fourth display device 14 may include fourth pixels PX4 arranged in a matrix in the first direction DR1 and the second direction DR2 to display an image.

A minimum distance between the first pixels PX1 adjacent in the first direction DR1 may be defined as a first horizontal separation distance GH1, and a minimum distance between the second pixels PX2 adjacent in the first direction DR1 may be defined as a second horizontal separation distance GH2. The first horizontal separation distance GH1 and the second horizontal separation distance GH2 may be substantially the same.

The connection member SM may be located between the first pixel PX1 and the second pixel PX2 adjacent in the first direction DR1. A minimum distance G12 between the first pixels PX1 and the second pixels PX2 adjacent in the first direction DR1 may be the sum of the minimum distance GHS1 between the first pixel PX1 and the connection member SM in the first direction DR1, the minimum distance GHS2 between the second pixel PX2 and the connection member SM in the first direction DR1 and a width GSM1 of the connection member SM in the first direction DR1.

The minimum distance G12 between the first pixel PX1 and the second pixel PX2 adjacent in the first direction DR1, the first horizontal separation distance GH1, and the second horizontal separation distance GH2 may be substantially the same. To this end, the minimum distance GHS1 between the first pixel PX1 and the connection member SM in the first direction DR1 may be less than the first horizontal separation distance GH1, and the minimum distance GHS2 between the second pixel PX2 and the connection member SM in the first direction DR1 may be less than the second horizontal separation distance GH2. Further, the width GSM1 of the connection member SM in the first direction DR1 may be less than the first horizontal separation distance GH1 or the second horizontal separation distance GH2.

A minimum distance between the third pixels PX3 adjacent in the first direction DR1 may be defined as a third horizontal separation distance GH3, and a minimum distance between the fourth pixels PX4 adjacent in the first direction DR1 may be defined as a fourth horizontal separation distance GH4. The third horizontal separation distance GH3 and the fourth horizontal separation distance GH4 may be substantially the same.

The connection member SM may be located between the third pixel PX3 and the fourth pixel PX4 adjacent in the first direction DR1. A minimum distance G34 between the third pixel PX3 and the fourth pixel PX4 adjacent in the first direction DR1 may be the sum of a minimum distance GHS3 between the third pixel PX3 and the connection member SM in the first direction DR1, a minimum distance GHS4 between the fourth pixel PX4 and the connection member SM in the second direction DR1, and the width GSM1 of the connection member SM in the second direction DR1.

The minimum distance G34 between the third pixel PX3 and the fourth pixel PX4 adjacent in the first direction DR1, the third horizontal separation distance GH3, and the fourth horizontal separation distance GH4 may be substantially the same. To this end, the minimum distance GHS3 between the third pixel PX3 and the connection member SM in the first direction DR1 may be less than the third horizontal separation distance GH3, and the minimum distance GHS4 between the fourth pixel PX4 and the connection member SM in the first direction DR1 may be less than the fourth horizontal separation distance GH4. Further, in the first direction DR1, the width GSM1 of the connection member SM may be less than the third horizontal separation distance GH3 or the fourth horizontal separation distance GH4.

The minimum distance between the first pixels PX1 adjacent in the second direction DR2 may be defined as a first vertical separation distance GV1, and the minimum distance between the third pixels PX3 adjacent in the first direction DR2 may be defined as a third vertical separation distance GV3. The first vertical separation distance GV1 and the third vertical separation distance GV3 may be substantially the same.

The connection member SM may be located between the first pixel PX1 and the third pixel PX3 adjacent in the first direction DR2. A minimum distance G13 between the first pixel PX1 and the third pixel PX3 adjacent in the first direction DR2 may be the sum of a minimum distance GVS1 between the first pixel PX1 and the connection member SM in the second direction DR2, a minimum distance GVS3 between the third pixel PX3 and the connection member SM in the second direction DR2, and a width GSM2 of the connection member SM in the second direction DR2.

The minimum distance G13 between the first pixel PX1 and the third pixel PX3 adjacent in the second direction DR2, the first vertical separation distance GV1, and the third vertical separation distance GV3 may be substantially the same. To this end, the minimum distance GVS1 between the first pixel PX1 and the connection member SM in the second direction DR2 may be less than the first vertical separation distance GV1, and the minimum distance GVS3 between the third pixel PX3 and the connection member SM in the second direction DR2 may be less than the third vertical separation distance GV3. Further, in the second direction DR2, the width GSM2 of the connection member SM may be less than the first vertical separation distance GV1 or the third vertical separation distance GV3.

The minimum distance between the adjacent second pixels PX2 in the second direction DR2 may be defined as a second vertical separation distance GV2, and the minimum distance between the fourth pixels PX4 adjacent in the second direction DR2 may be defined as a fourth vertical separation distance GV4. The second vertical separation distance GV2 and the fourth vertical separation distance GV4 may be substantially the same.

The connection member SM may be located between the second pixel PX2 and the fourth pixel PX4 adjacent in the second direction DR2. The minimum distance G24 between the second pixel PX2 and the fourth pixel PX4 adjacent in the second direction DR2 may be the sum of the minimum distance GVS2 between the second pixel PX2 and the connection member SM in the second direction DR2, the minimum distance GVS4 between the fourth pixel PX4 and the joint SM in the second direction DR2, and the width GSM2 of the connection member SM in the second direction DR2.

A minimum distance G24 between the second pixel PX2 and the fourth pixel PX4 adjacent in the second direction DR2, a second vertical separation distance GV2, and a fourth vertical separation distance GV4 may be substantially the same. To this end, a minimum distance GVS2 between the second pixel PX2 and the connection member SM in the second direction DR2 may be less than the second vertical separation distance GV2, and a minimum distance GVS4 between the fourth pixel PX4 and the connection member SM in the second direction DR2 may be less than the fourth vertical separation distance GV4. Further, in the first direction DR2, the width GSM2 of the connection member SM may be less than the second vertical separation distance GV2 or the fourth vertical separation distance GV4.

As shown FIGS. 14, the minimum distance between pixels of adjacent display devices may be substantially equal to the minimum distance between each of the pixels to reduce or prevent the likelihood of the connection member SM being recognized between images displayed by the plurality of display devices 11, 12, 13, and 14.

Figure 15:
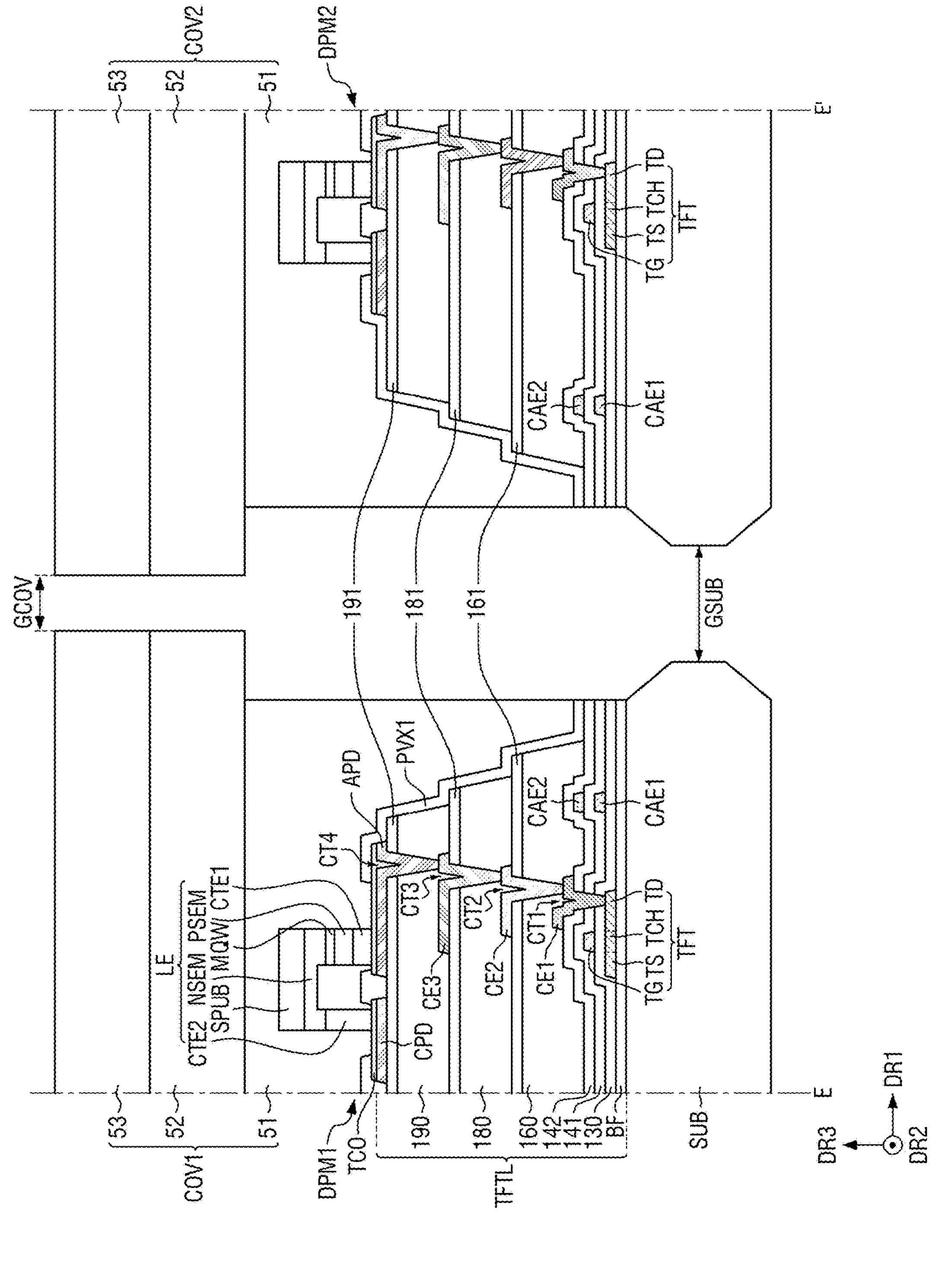
FIG. 15 is a cross-sectional view illustrating an example of a tiled display device taken along the line E-E' of FIG. 14.
Figure 16:
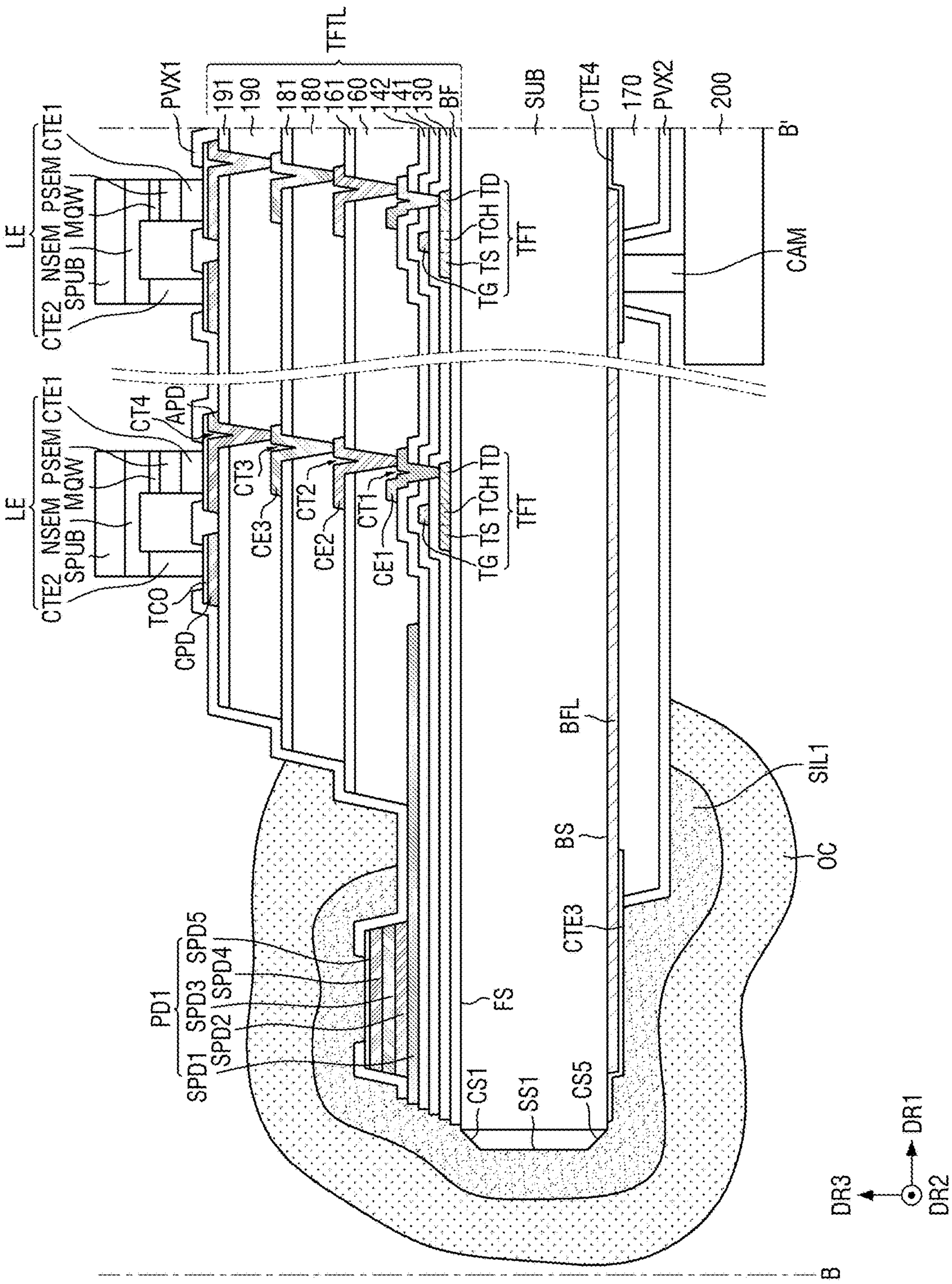
FIG. 16 is a cross-sectional view illustrating an example of a tiled display device taken along the line B-B' of FIG. 2.

FIG. 15 is a cross-sectional view illustrating an example of a tiled display device taken along the line E-E' of FIG. 14. FIG. 16 is a cross-sectional view illustrating an example of a tiled display device taken along the line B-B' of FIG. 2.

Referring to FIGS. 15 and 16, the first display device 11 includes a first display module DPM1 and a first front cover COV1. The second display device 12 includes a second display module DPM2 and a second front cover COV2.

Each of the first display module DPM1 and the second display module DPM2 includes a substrate SUB, a thin film transistor layer TFTL, and light-emitting elements LE.

Referring to FIGS. 15 and 16, the display panel 100 may include the thin film transistor layer TFTL and the light-emitting elements LE located on the substrate SUB. The thin film transistor layer TFTL may be a layer in which thin film transistors TFT are formed.

The thin film transistor layer TFTL includes an active layer ACT, a first gate metal layer, a second gate metal layer, a first data metal layer, a second data metal layer, a third data metal layer, and a fourth data metal layer. Also, the thin film transistor layer TFTL includes a buffer film BF, a gate-insulating layer 130, a first interlayer insulating layer 141, a second interlayer insulating layer 142, a first planarization layer 160, a first insulating layer 161, a second planarization layer 180, and a second insulating layer 181.

The substrate SUB may be a base substrate or a base member for supporting the display device 10. The substrate SUB may be a rigid substrate made of glass, but the present disclosure is not limited thereto. The substrate SUB may be a flexible substrate capable of being bent, folded, or rolled. In this case, the substrate SUB may include an insulating material, such as a polymer resin, such as polyimide PI.

A buffer layer BF may be located on one surface of the substrate SUB. The buffer film BF may be a film for reducing or preventing penetration of air or moisture. The buffer layer BF may be made of a plurality of inorganic layers alternately stacked. For example, the buffer layer BF may be formed as a multilayer in which one or more inorganic layers of a silicon nitride layer, a silicon oxynitride layer, a silicon oxide layer, a titanium oxide layer, and an aluminum oxide layer are alternately stacked. The buffer layer BF may be omitted.

The active layer ACT may be located on the buffer layer BF. The active layer ACT may include a silicon semiconductor, such as polycrystalline silicon, single crystal silicon, low-temperature polycrystalline silicon, and amorphous silicon or may include an oxide semiconductor.

The active layer ACT may include a channel TCH, a first electrode TS, and a second electrode TD of the thin film transistor TFT. The channel TCH of the thin film transistor TFT may be a region overlapping the gate electrode TG of the thin film transistor TFT in the third direction DR3, which is the thickness direction of the substrate SUB. The first electrode TS of the thin film transistor TFT may be located on one side of the channel TCH, and the second electrode TD may be located on the other side of the channel TCH. The first electrode TS and the second electrode TD of the thin film transistor TFT may be regions that do not overlap with the gate electrode TG in the third direction DR3. The first electrode TS and the second electrode TD of the thin film transistor TFT may be regions having conductivity by doping ions in a silicon semiconductor or an oxide semiconductor.

A gate-insulating layer 130 may be located on the active layer ACT. The gate-insulating layer 130 may be formed of an inorganic layer, for example, a silicon nitride layer, a silicon oxynitride layer, a silicon oxide layer, a titanium oxide layer, or an aluminum oxide layer.

The first gate metal layer may be located on the gate-insulating layer 130. The first gate metal layer may include the gate electrode TG of the thin film transistor TFT and the first capacitor electrode CAE1. The first gate metal layer may be formed as a single layer or multiple layers made of any one of molybdenum (Mo), aluminum (Al), chromium (Cr), gold (Au), titanium (Ti), nickel (Ni), neodymium (Nd), and/or copper (Cu) and/or an alloy thereof.

A first interlayer insulating layer 141 may be located on the first gate metal layer. The first interlayer insulating layer 141 may be formed of the inorganic layer, for example, the silicon nitride layer, the silicon oxynitride layer, the silicon oxide layer, the titanium oxide layer, or the aluminum oxide layer.

The second gate metal layer may be located on the first interlayer insulating layer 141. The second gate metal layer may be formed as a single layer or multiple layers made of any one of molybdenum (Mo), aluminum (Al), chromium (Cr), gold (Au), titanium (Ti), nickel (Ni), neodymium (Nd), and/or copper (Cu) and/or an alloy thereof.

A second interlayer insulating layer 142 may be located on the second gate metal layer. The second interlayer insulating layer 142 may be formed of the inorganic layer, for example, the silicon nitride layer, the silicon oxynitride layer, the silicon oxide layer, the titanium oxide layer, or the aluminum oxide layer.

A first data metal layer including a first connection electrode CE1, a first sub pad SPD1, and a data line DL may be located on the second interlayer insulating layer 142. The data line DL may be integrally formed with the first sub pad SPD1, but the present disclosure is not limited thereto. The first data metal layer may be formed as a single layer or multiple layers made of any one of molybdenum (Mo), aluminum (Al), chromium (Cr), gold (Au), titanium (Ti), nickel (Ni), neodymium (Nd), and/or copper (Cu) and/or an alloy thereof.

The first connection electrode CE1 may be connected to the first electrode TS or the second electrode TD of the thin film transistor TFT through a first contact hole CT1 penetrating the first interlayer insulating layer 141 and the second interlayer insulating layer 142.

A first planarization layer 160 may be located on the first data metal layer for flattening a step due to the active layer ACT, the first gate metal layer, the second gate metal layer, and the first data metal layer. The first planarization layer 160 may be formed of an organic layer, such as acryl resin, epoxy resin, phenolic resin, polyamide resin, and/or polyimide resin.

The second data metal layer may be located on the first planarization layer 160. The second data metal layer may include a second connection electrode CE2 and a second sub pad SPD2. The second connection electrode CE2 may be connected to the first connection electrode CE1 through a second contact hole CT2 penetrating the first insulating layer 161 and the first planarization layer 160. The second data metal layer may be formed as a single layer or multiple layers made of any one of molybdenum (Mo), aluminum (Al), chromium (Cr), gold (Au), titanium (Ti), nickel (Ni), neodymium (Nd), and/or copper (Cu) and/or an alloy thereof.

The second planarization layer 180 may be located on the second data metal layer. The second planarization layer 180 may be formed of the organic film, such as acryl resin, epoxy resin, phenolic resin, polyamide resin, and/or polyimide resin.

The third data metal layer may be located on the second planarization layer 180. The third data metal layer may include a third connection electrode CE3 and a third sub pad SPD3. The third connection electrode CE3 may be connected to the second connection electrode CE2 through a third contact hole CT3 penetrating the second insulating layer 181 and the second planarization layer 180. The third data metal layer may be formed as a single layer or multiple layers made of any one of molybdenum (Mo), aluminum (Al), chromium (Cr), gold (Au), titanium (Ti), nickel (Ni), neodymium (Nd), and/or copper (Cu) and/or an alloy thereof.

A third planarization layer 190 may be located on the third data metal layer. The third planarization layer 190 may be formed of the organic layer, such as acryl resin, epoxy resin, phenolic resin, polyamide resin, and/or polyimide resin.

The fourth data metal layer may be located on the third planarization layer 190. The fourth data metal layer may include an anode pad electrode APD, a cathode pad electrode CPD, and a fourth sub pad SPD4. The anode pad electrode APD may be connected to the third connection electrode CE3 through a fourth contact hole CT4 penetrating the third insulating layer 191 and the third planarization layer 190. The cathode pad electrode CPD may be supplied with the first power supply voltage, which is a low potential voltage. The fourth data metal layer metal layer may be formed as a single layer or multiple layers made of any one of molybdenum (Mo), aluminum (Al), chromium (Cr), gold (Au), titanium (Ti), nickel (Ni), neodymium (Nd), and/or copper (Cu) and/or an alloy thereof.

A transparent conductive layer TCO for increasing adhesion with the first and second contact electrodes CTE1 and CTE2 of the light-emitting element LE and a fifth sub pad SPD5 may be located on each of the anode pad electrode APD and the cathode pad electrode CPD. The transparent conductive layer TCO and the fifth sub pad SPD5 may be formed of the transparent conductive oxide, such as indium tin oxide (ITO) or indium zinc oxide (IZO).

A first passivation layer PVX1 may be located on the anode pad electrode APD, the cathode pad electrode CPD, and the first pad PD1. The first passivation layer PVX1 may be located to cover edges of the anode pad electrode APD, the cathode pad electrode CPD, and the first pad PD1. The first passivation layer PVX1 may be formed of the inorganic layer, such as a silicon nitride layer, a silicon oxy nitride layer, a silicon oxide layer, a titanium oxide layer, or an aluminum oxide layer.

The light-emitting element LE is a flip chip type micro LED in which the first contact electrode CTE1 and the second contact electrode CTE2 are located to face the anode pad electrode APD and the cathode pad electrode CPD. The light-emitting element LE may be an inorganic light-emitting element made of an inorganic material, such as GaN. The light-emitting element LE may have a length of several to hundreds of μm in the first direction DR1, the second direction DR2, and the third direction DR3. For example, each of the lengths of the light-emitting element LE in the first direction DR1, in the second direction DR2, and in the third direction DR3 may be about 100 μm or less.

The light-emitting elements LE may be formed by being grown on a semiconductor substrate, such as a silicon wafer. Each of the light-emitting elements LE may be transferred directly from the silicon wafer onto the anode pad electrode APD and the cathode pad electrode CPD of the substrate SUB. Alternatively, each of the light-emitting elements LE may be transferred to the anode pad electrode APD and the cathode pad electrode CPD of the substrate SUB through an electrostatic method using an electrostatic head or a stamp method using an elastic polymer material, such as PDMS or silicon as a transfer substrate.

Each of the light-emitting elements LE may be a light-emitting structure including a base substrate SPUB, an n-type semiconductor NSEM, an active layer MQW, a p-type semiconductor PSEM, a first contact electrode CTE1, and a second contact electrode CTE2.

The base substrate SPUB may be a sapphire substrate, but the present disclosure is not limited thereto.

The n-type semiconductor NSEM may be located on one surface of the base substrate SPUB. For example, the n-type semiconductor NSEM may be located on the lower surface of the base substrate SPUB. The n-type semiconductor NSEM may be made of GaN doped with an n-type conductivity-type dopant, such as Si, Ge, or Sn.

The active layer MQW may be located on a portion of one surface of the n-type semiconductor NSEM. The active layer may include a material having a single or multiple quantum well structure. When the active layer contains a material having a multiple quantum well structure, the active layer may have the structure in which a plurality of well layers and barrier layers are alternately laminated. In this case, the well layer may be formed of InGaN, and the barrier layer may be formed of GaN or AlGaN, but the present disclosure is not limited thereto. Alternatively, the active layer may have a structure in which semiconductor materials having large band gap energy and semiconductor materials having small band gap energy are alternately stacked, and may include other Group III to Group V semiconductor materials according to a wavelength band of the emitted light.

The p-type semiconductor PSEM may be located on one surface of the active layer MQW. The p-type semiconductor PSEM may be made of GaN doped with a p-type conductivity-type dopant, such as Mg, Zn, Ca, Se, or Ba.

The first contact electrode CTE1 may be located on the p-type semiconductor PSEM, and the second contact electrode CTE2 may be located on another portion of one surface of the n-type semiconductor NSEM. Another portion of one surface of the n-type semiconductor NSEM on which the second contact electrode CTE2 is located may be located apart from a portion of one surface of the n-type semiconductor NSEM on which the active layer MQW is located.

The first contact electrode CTE1 and the anode pad electrode APD may be adhered to each other through the conductive adhesive, such as an anisotropic conductive film ACF or an anisotropic conductive paste ACP. Alternatively, the first contact electrode CTE1 and the anode pad electrode APD may be bonded to each other through a soldering process.

The first pad PD1 may include first to fifth sub pads SPD1, SPD2, SPD3, SPD4, and SPD5. The second sub pad SPD2 may be located on the first sub pad SPD1, and the third sub pad SPD3 may be located on the second sub pad SPD2. The fourth sub pad SPD4 may be located on the third sub pad SPD3, and the fifth sub pad SPD5 may be located on the fourth sub pad SPD4. An upper surface of the first sub pad SPD1 may contact a lower surface of the second sub pad SPD2, and an upper surface of the second sub pad SPD2 may contact a lower surface of the third sub pad SPD3. An upper surface of the third sub pad SPD3 may contact a lower surface of the fourth sub pad SPD4, and an upper surface of the fourth sub pad SPD4 may contact a lower surface of the fifth sub pad SPD5.

A bottom fan-out line BFL may be located on the bottom surface of the substrate SUB. The bottom fan-out line BFL may be formed as a single layer or multiple layers made of any one of molybdenum (Mo), aluminum (Al), chromium (Cr), gold (Au), titanium (Ti), nickel (Ni), neodymium (Nd), and/or copper (Cu) and/or an alloy thereof.

A third contact electrode CTE3 may be located on one end of the bottom fan-out line BFL, and a fourth contact electrode CTE4 may be located on the other end of the bottom fan-out line BFL. The third contact electrode CTE3 and the fourth contact electrode CTE4 may be formed of the transparent conductive oxide, such as indium tin oxide (ITO) or indium zinc oxide (IZO).

A fourth planarization layer 170 may be located on the bottom surface of the fourth contact electrode CTE4 and the substrate SUB. The fourth planarization layer 170 may be formed of the organic film, such as acrylic resin, epoxy resin, phenolic resin, polyamide resin, polyimide resin, etc.

A second passivation layer PVX2 may be located on the fourth planarization layer 170. The second passivation layer PVX2 may be formed of the inorganic layer, for example, the silicon nitride layer, the silicon oxynitride layer, the silicon oxide layer, the titanium oxide layer, or the aluminum oxide layer.

The first side wiring SIL1 may be located on the first surface FS, the first chamfered surface CS1, the first side surface SS1, the fifth chamfered surface CS5, and the second surface BS of the substrate SUB. The first side wiring SIL1 is located on the first pad PD1 located at the edge of the first surface FS of the substrate SUB and may be connected to the first pad PD1. The first side wiring SIL1 is located on the third contact electrode CTE3 located at the edge of the second surface BS of the substrate SUB, and may be connected to the third contact electrode CTE3.

An overcoat layer OC may be located on the first surface FS, the first chamfered surface CS1, the first side surface SS1, the fifth chamfered surface CS5, and the second surface BS of the substrate SUB. The overcoat layer OC may be located to cover the first lateral line SIL1. The overcoat layer OC may be formed of the organic layer, such as acryl resin, epoxy resin, phenolic resin, polyamide resin, and/or polyimide resin.

The circuit board 200 may be located on the bottom surface of the substrate SUB. The circuit board 200 may be connected to the fourth contact electrode CTE4 exposed without being covered by the fourth planarization layer 170 and the second passivation layer PVX2 by using a conductive adhesive member CAM. The circuit board 200 may be connected to the fourth contact electrode CTE4 through the conductive adhesive member CAM. The conductive adhesive member CAM may be the anisotropic conductive film or the anisotropic conductive paste.

A distance GSUB between the substrate SUB of the first display device 11 and the substrate SUB of the second display device 12 may be greater than a distance GCOV between the first front cover COV1 and the second front cover COV2.

Each of the first front cover COV1 and the second front cover COV2 may include an adhesive member 51, a light transmittance control layer 52 located on the adhesive member 51, and an anti-glare layer 53 located on the light transmittance control layer 52.

The adhesive member 51 of the first front cover COV1 serves to attach the light-emitting element layer EML of the first display module DPM1 and the first front cover COV1. The adhesive member 51 of the second front cover COV2 serves to attach the light-emitting element layer EML2 of the second display module DPM2 and the second front cover COV2. The adhesive member 51 may be a transparent adhesive member capable of transmitting light. For example, the adhesive member 51 may be an optically clear adhesive film or an optically clear resin.

The anti-glare layer 53 may be designed to diffusely reflect external light to reduce or prevent deterioration in visibility of an image by reflecting external light as it is. Accordingly, the contrast ratio of images displayed by the first display device 10 and the second display device 20 may be increased due to the anti-glare layer 53.

A light transmittance control layer 52 may be designed to reduce transmittance of external light or light reflected from the first display module DPM1 and the second display module DPM2. Accordingly, it is possible to reduce or prevent visibility of the gap GSUB between the substrate SUB of the first display module DPM1 and the substrate SUB of the second display module DPM2.

The anti-glare layer 53 may be implemented as a polarizing plate, and the light transmittance control layer 52 may be implemented as a phase retardation layer, but the present disclosure is not limited thereto.

Meanwhile, because an example of the tiled display device cut along the lines F-F', G-G', and H-H' of FIG. 15 is substantially the same as an example of the tiled display device cut along E-E' described in conjunction with FIG. 16, a description thereof is omitted.

Figure 17:
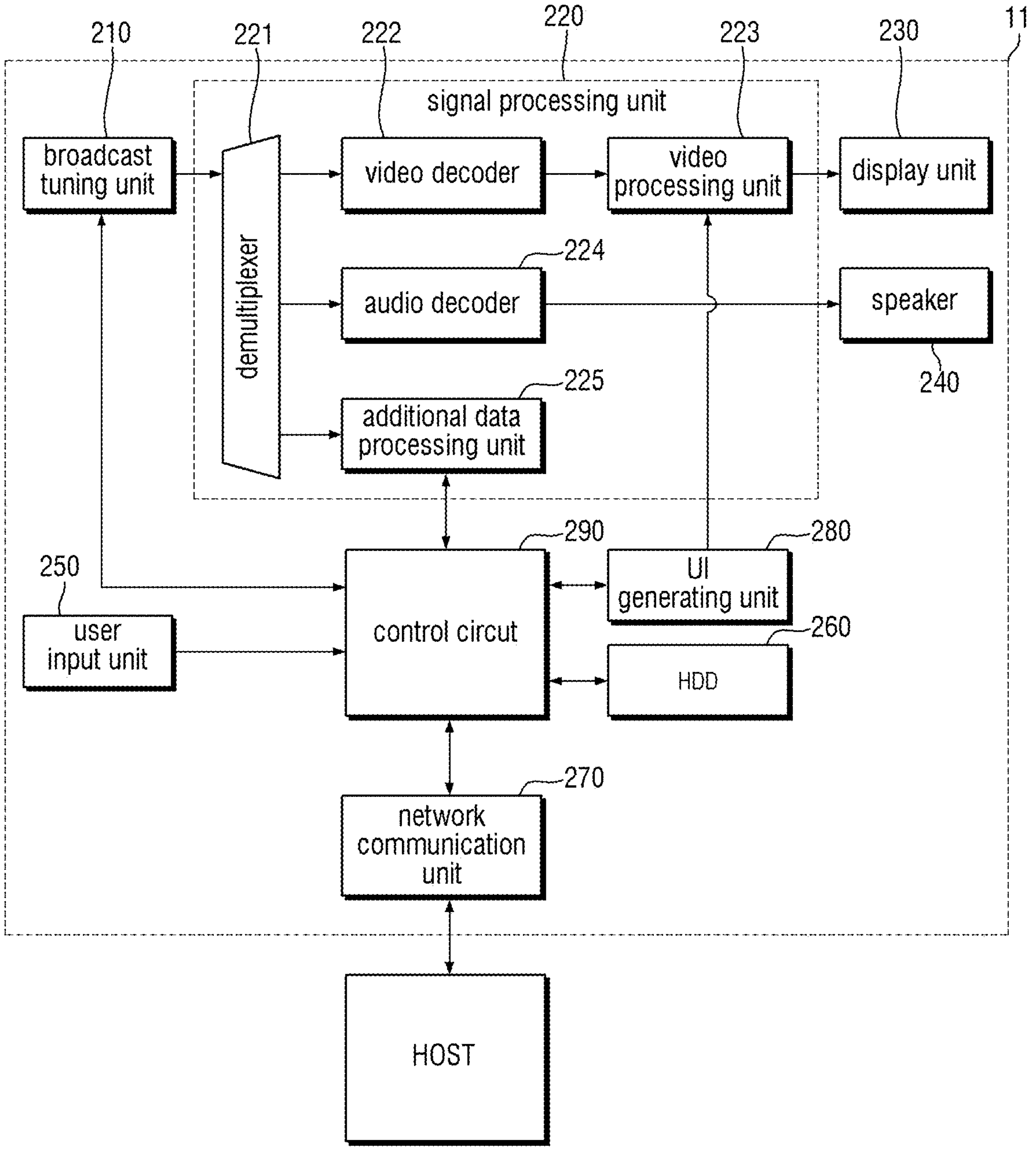
FIG. 17 is a block diagram illustrating a tiled display device according to one or more embodiments.

FIG. 17 is a block diagram illustrating a tiled display device according to one or more embodiments.

The host system HOST may be implemented as any one of a television system, a home theater system, a set-top box, a navigation system, a DVD player, a Blu-ray player, a personal computer PC, a mobile phone system, and/or a tablet.

A user's command may be input to the host system HOST in various formats. For example, the host system HOST may receive a command by a user's touch input. Alternatively, the user's command may be input to the host system HOST by a keyboard input or a button input of a remote controller.

The host system HOST may receive an original video data ODATA corresponding to the original image from the outside. The host system HOST may divide the original video data ODATA by the number of display devices. For example, the host system HOST corresponds to the first display device 11, the second display device 12, the third display device 13, and the fourth display device 14, so that the original video data ODATA may be divided into the first video data corresponding to a first image, the second video data corresponding to a second image, the third video data corresponding to a third image, and the fourth video data corresponding to a fourth image. The host system HOST may transmit the first video data to the first display device 11, the second video data to the second display device 12, the third video data to the third display device 13, and the fourth video data to the fourth display device 14.

The first display device 11 may display the first image according to the first video data, and the second display device 12 may display the second image according to the second video data. Also, the third display device 13 may display the third image according to the third video data, and the fourth display device 14 may display the fourth image according to the fourth video data. Accordingly, a user may view the original image in which the first to the fourth images displayed on the first to fourth display devices 11, 12, 13 and 14 are combined.

The first display device 11 may include a broadcast tuner 210, a signal processor 220, a display 230, a speaker 240, a user input device 250, a storage device (e.g., a hard disk drive (HDD)) 260, a network communicator 270, a User Interface (UI), a generator 280, and a control circuit 290.

The broadcast tuner 210 may receive a broadcast signal of the corresponding channel through an antenna by tuning a channel frequency (e.g., predetermined channel frequency) under the control of the control circuit 290. The broadcast tuner 210 may include a channel detection module and an RF demodulation module.

The broadcast signal demodulated by the broadcast tuner 210 is processed by the signal processor 220 and output to the display 230 and the speaker 240. Here, the signal processor 220 may include a demultiplexer 221, a video decoder 222, a video processor 223, an audio decoder 224, and an additional data processor 225. The demultiplexer 221 separates the demodulated broadcast signal into a video signal, an audio signal, and additional data. The separated video signal, audio signal, and additional data are restored by the video decoder 222, the audio decoder 224, and the additional data processor 225, respectively. In this case, the video decoder 222, the audio decoder 224, and the additional data processor 225 restore a decoding format corresponding to the encoding format when the broadcast signal is transmitted.

Meanwhile, the decoded video signal is converted by the video processor 223 into vertical frequency, resolution, aspect ratio, etc. that meet the output standard of the display 230, and the decoded audio signal is output to the speaker 240.

The display 230 includes a display panel 100 on which an image is displayed and a panel-driving circuit that controls driving of the display panel 100.

The user input device 250 may receive a signal transmitted by the host system HOST. The user input device 250 allows the user to select not only data related to channel selection and User Interface (UI) menu selection and manipulation of a channel transmitted by the host system HOST, but also commands related to communication with other display devices. Also, the user input device 250 allows data for input to be entered.

The storage device 260 stores various software programs including OS programs, recorded broadcast programs, moving pictures, photos, and other data. The storage device 260 may be made of a storage medium, such as a hard disk or non-volatile memory.

The network communicator 270 is for short-distance communication with the host system HOST and other display devices. The network communicator 270 may be implemented a communication module including an antenna pattern that may implement mobile communication, data communication, Bluetooth, RF, Ethernet, etc.

The network communicator 270 may transmit and receive wireless signals to and from at least one of a base station, an external terminal, and/or a server on a mobile communication network constructed according to technical standards or communication methods for mobile communication (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), 5G, etc.) through the antenna electrodes AE.

The network communicator 270 may transmit and receive wireless signals in a communication network according to wireless Internet technologies through the antenna electrodes AE. The wireless Internet technologies include, for example, WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), High Speed Downlink Packet Access (HSDPA), High Speed Uplink Packet Access (HSUPA), Long Term Evolution (LTE), Long Term Evolution-Advanced (LTE-A), etc. The antenna electrodes AE transmit and receive data according to at least one wireless Internet technology within a range including even Internet technologies not listed above.

In addition, each of the first to fourth display devices 11, 12, 13, and 14 may include antenna electrodes AE, thereby transmitting and receiving wireless signals to and from each other. The first display device 11 may transmit a first wireless signal, and the second to fourth display devices 12, 13, and 14 may receive the first wireless signal. Also, the second display device 12 may transmit a second wireless signal, and the first, third, and fourth display devices 11, 13, and 14 may receive the second wireless signal. In addition, the third display device 13 may transmit a third wireless signal, and the first, second, and fourth display devices 11, 12, and 14 may receive the third wireless signal. Also, the fourth display device 14 may transmit a fourth wireless signal, and the first to third display devices 11, 12, and 13 may receive the fourth wireless signal.

The generator 280, which may generate a UI menu for wireless communication with the host system HOST and the second to fourth display devices 12, 13, and 14 may be implemented by an algorithm code and an OSD IC. The UI menu for communication with the host system HOST and the second to fourth display devices 12, 13, and 14 may be a menu for designating a counterpart digital TV for communication and selecting a desired function.

The control circuit 290 is responsible for overall control of the first display device 11 and responsible for communication control of the host system HOST and the second through fourth display devices 12 through 14. In the control circuit 290, a corresponding algorithm code stores for control and the corresponding algorithm code may be implemented by an Micro Controller Unit (MCU).

According to the input and selection of the user input device 250, the control circuit 290 controls to transmit the corresponding control command and data to the host system HOST and the second to fourth display devices 12, 13, and 14 through the network communicator 270. When a control command (e.g., predetermined control command) and data are received from the host system HOST and the second to fourth display devices 12, 13, and 14, the control circuit 290 performs an operation according to the control command.

It should be noted that the aspects of embodiments of the present disclosure are not restricted to the one set forth herein. The above and other aspects of the present disclosure will become more apparent to one of daily skill in the art to which the present disclosure pertains by referencing the claims, with functional equivalents thereof to be included therein.

What is claimed is:

1. A display device comprising:
- PWM data lines for respectively receiving PWM data voltages;
- first to third data lines for respectively receiving first to third data voltages;
- sub-pixels respectively connected to the PWM data lines, respectively connected to the first to third data lines, and respectively comprising at least one light-emitting element;
- a global power supply line for receiving a global power supply voltage; and
- a first demultiplexer between the PWM data lines and the global power supply line,
- wherein the PWM data voltages have grayscale voltages from a black grayscale voltage to a white grayscale voltage, the black grayscale voltage being greater than or equal to the global power supply voltage.

2. The display device of claim 1, further comprising a first power supply line for receiving a first power supply voltage, and connected to a first electrode of the at least one light-emitting element,
- wherein a voltage difference between the global power supply voltage and the black grayscale voltage is less than a voltage difference between the global power supply voltage and the first power supply voltage.

3. The display device of claim 1, further comprising:
- fan-out lines; and
- a second demultiplexer between the PWM data lines and the fan-out lines, and configured to selectively connect the fan-out lines to Q PWM data lines among the PWM data lines, or to Q first to third data lines among the first to third data lines, Q being an integer that is greater than or equal to 2.

4. The display device of claim 3, further comprising:
- a data-driving circuit for supplying the PWM data voltages to the fan-out lines; and
- a power supply for supplying the first to third data voltages and the global power supply voltage.

5. The display device of claim 3, wherein the sub-pixels comprise a first sub-pixel, a second sub-pixel, and a third sub-pixel,
- wherein the second demultiplexer is configured to:
  - connect one of the fan-out lines to a first PWM data line that is connected to the first sub-pixel among the Q PWM data lines during a first period, to a second PWM data line that is connected to the second sub-pixel among the Q PWM data lines during a second period, and to a third PWM data line that is connected to the third sub-pixel among the Q PWM data lines during a third period.

6. The display device of claim 5, wherein the first demultiplexer is configured to:
- connect the second data line connected to the second sub-pixel, and the third data line connected to the third sub-pixel, to the global power supply line during the first period;
- connect the first data line connected to the first sub-pixel, and the third data line connected to the third sub-pixel, to the global power supply line during the second period; and
- connect the first data line connected to the first sub-pixel, and the second data line connected to the second sub-pixel, to the global power supply line during the third period.

7. The display device of claim 1, further comprising:
- a first data voltage line for receiving the first data voltage;
- a second data voltage line for receiving the second data voltage; and
- a third data voltage line for receiving the third data voltage,
- wherein the first demultiplexer is configured to connect the first data line to the first data voltage line, the second data line to the second data voltage line, and the third data line to the third data voltage line.

8. The display device of claim 1, wherein the light-emitting element is a flip chip type micro light-emitting diode element.

9. A tiled display device comprising:
- display devices; and
- a connection member between the display devices,
- wherein one display device among the display devices comprises:
  - PWM data lines for respectively receiving PWM data voltages;
  - first to third data lines for respectively receiving first to third data voltages;
  - sub-pixels respectively connected to the PWM data lines, respectively connected to the first to third data lines, and comprising at least one light-emitting element;
  - a first power supply line connected to a first electrode of the at least one light-emitting element, and for receiving a first power supply voltage;
  - a global power supply line for receiving a global power supply voltage; and
  - a first demultiplexer between the PWM data lines and the global power supply line,
- wherein the PWM data voltages comprise grayscale voltages ranging from a black grayscale voltage to a white grayscale voltage, and
- wherein a voltage difference between the global power supply voltage and the black grayscale voltage is less than a voltage difference between the global power supply voltage and the first power supply voltage.

10. The tiled display device of claim 9, wherein a potential of the global power supply voltage is less than or equal to the black grayscale voltage.

11. The tiled display device of claim 9, wherein the one display device further comprises:
- fan-out lines; and
- a second demultiplexer between the PWM data lines and the fan-out lines, and configured to selectively connect one of the fan-out lines to Q PWM data lines among the PWM data lines, or to Q first to third data lines among the first to third data lines, Q being an integer greater than or equal to 2.

12. The tiled display device of claim 11, wherein the one display device further comprises:

a substrate;

a first pad on a first surface of the substrate and connected to the global power supply line; and a first side wiring on the first surface, on a second surface opposite to the first surface, on a side surface between the first surface and the second surface, and connected to the first pad of the substrate.

13. The tiled display device of claim 12, wherein the substrate comprises glass.

14. The tiled display device of claim 12, wherein the one display device further comprises:

a first connection line on the second surface of the substrate, and connected to the first side wiring;

a first flexible film connected to the first connection line through a first conductive adhesive member; and a power supply on the first flexible film, and configured to generate the global power supply voltage and the first to third data voltages.

15. The tiled display device of claim 12, wherein the one display device further comprises:

a second pad on the first surface of the substrate, and connected to one of the fan-out lines; and a second side wiring on the first surface, on the second surface, on the side surface, and connected to the second pad.

16. The tiled display device of claim 15, wherein the first pad is adjacent to a first side of the first surface of the substrate, and wherein the second pad is adjacent to a second side opposite to the first side of the first surface of the substrate.

17. The tiled display device of claim 15, wherein the one display device further comprises:

a second connection line on the second surface, and connected to the second side wiring;

a second flexible film connected to the second connection line through a second conductive adhesive member; and a data-driving circuit on the second flexible film, and configured to generate the PWM data voltages.

18. The tiled display device of claim 9, wherein the display devices are arranged in a matrix form in M rows and N columns, M and N being positive integers.

19. The tiled display device of claim 9, wherein the light-emitting element is a flip chip type micro light-emitting diode element.

20. The tiled display device of claim 9, wherein the one display device further comprises:

a first data voltage line for receiving a first data voltage;

a second data voltage line for receiving a second data voltage; and a third data voltage line for receiving a third data voltage, wherein the first demultiplexer is configured to connect the first data lines to the first data voltage line, is configured to connect the second data lines to the second data voltage line, and is configured to connect the third data lines to the third data voltage line.

* * * * *